United States Patent [19]

Nakamura et al.

[11] Patent Number: 5,721,959

[45] Date of Patent: Feb. 24, 1998

[54] INFORMATION PROCESSING APPARATUS FOR PATTERN EDITING USING LOGIC RELATIONSHIP REPRESENTATIVE PATTERNS

[75] Inventors: Takashi Nakamura, Hiratsuka; Tsuneaki Kadosawa, Kanagawa-ken; Kunitaka Ozawa, Isehara; Tomoaki Kawai, Yokohama; Eiji Koga, Hadano; Satoshi Ogiwara, Sagamihara, all of Japan

[73] Assignee: Canon Kabushiki Kaisha, Tokyo, Japan

[21] Appl. No.: 347,173

[22] Filed: Nov. 22, 1994

Related U.S. Application Data

[63] Continuation of Ser. No. 3,935, Jan. 21, 1993, abandoned, which is a continuation of Ser. No. 373,105, Jun. 29, 1989, abandoned.

[30] Foreign Application Priority Data

| Jul. 1, 1988 | [JP] | Japan | 63-165657 |
| Jul. 5, 1988 | [JP] | Japan | 63-168180 |
| Oct. 6, 1988 | [JP] | Japan | 63-252994 |
| Oct. 7, 1988 | [JP] | Japan | 63-254246 |
| Nov. 10, 1988 | [JP] | Japan | 63-284212 |
| Nov. 15, 1988 | [JP] | Japan | 63-287944 |
| Nov. 17, 1988 | [JP] | Japan | 63-290472 |

[51] Int. Cl.$^6$ .................................. G06F 17/50
[52] U.S. Cl. .................. 395/919; 345/115; 345/146; 364/488; 364/468.09; 395/133; 395/354; 395/967
[58] Field of Search .............. 364/488, 491, 364/468.09; 395/155, 135, 133, 352, 354, 919, 967; 345/115, 146

[56] References Cited

U.S. PATENT DOCUMENTS

| 3,930,237 | 12/1975 | Villers | 364/200 |
| 4,546,434 | 10/1985 | Gioello | 364/400 |
| 4,613,940 | 9/1986 | Shenton et al. | 364/490 |
| 4,638,442 | 1/1987 | Bryant et al. | 364/489 |
| 4,656,603 | 4/1987 | Dunn | 364/900 |
| 4,686,522 | 8/1987 | Hernandez et al. | 345/160 |
| 4,710,767 | 12/1987 | Sciacero et al. | 345/191 |
| 4,745,561 | 5/1988 | Hirosawa et al. | 395/171 |
| 4,757,470 | 7/1988 | Bruce et al. | 395/135 |
| 4,806,919 | 2/1989 | Nakayama et al. | 345/120 |
| 4,808,987 | 2/1989 | Takeda et al. | 345/115 |
| 4,829,446 | 5/1989 | Draney | 364/488 |
| 4,847,604 | 7/1989 | Doyle | 345/180 |
| 4,873,643 | 10/1989 | Powell et al. | 364/468.09 |
| 4,885,694 | 12/1989 | Pray et al. | 364/464.1 |
| 4,903,214 | 2/1990 | Hiwatashi | 364/491 |
| 4,974,175 | 11/1990 | Suzuki et al. | 364/522 |
| 5,025,395 | 6/1991 | Nose et al. | 395/335 |
| 5,068,802 | 11/1991 | Miyashita et al. | 395/133 |
| 5,070,534 | 12/1991 | Lascelles et al. | 395/348 |

*Primary Examiner*—Kenneth S. Kim
*Attorney, Agent, or Firm*—Fitzpatrick, Cella, Harper & Scinto

[57] ABSTRACT

A pattern editing apparatus includes a selector for selecting a plurality of patterns to be object patterns for an editing process. The plurality of patterns are displayed in a first area on a screen. The pattern selected by the selector is displayed in a second area on the screen. The apparatus also includes a provider, responsive to the selector, for providing a pattern for coupling the selected patterns displayed in the second area. The pattern coupling represents a flow chart processing relationship among the selected patterns. Also provided is a generator for generating a signal responsive to the absence of any pattern representing a flow chart processing relationship in the selected patterns, and an adder for adding the pattern representing the flow chart processing relationship as an object pattern of the editing process.

16 Claims, 36 Drawing Sheets

FIG. 3

① VARIABLE DEFINITION TABLE

| VARIABLE NAME | CPU | TYPE | INITIAL VALUE |
|---|---|---|---|
| VAR1[20] | 2 | INT | |
| VAR2 | 1 | STRUCT { : } | |
| CHAR1[16] | 3 | CHAR | "xxyyzz" |

MAX. 16 CHARACTERS(+NULL) — arrow to VAR name
INSERT NULL IN THE END — arrow to initial value

② I/O DEFINITION TABLE

| I/O NAME | CPU | ADDR | BIT | LOGIC | HANDLER POINTER |
|---|---|---|---|---|---|
| | | | | | NULL |
| | | | | | PU AD1 |

CPU NO. : CPU
ADDRESS : ADDR
DESIGNATION BIT : BIT
±LOGIC : LOGIC
POINTER TO HANDLER (IN CASE OF NULL : SIMPLE I/O) : HANDLER POINTER

③ INTERRUPTION DEFINITION TABLE

| I/O NAME | CPU | ADDR | HARDWARE LINE | LOGIC | INTERRUPTION LEVEL | STARTED-UP PU |
|---|---|---|---|---|---|---|
| | | | | | | |

④ PROCESSOR UNIT DEFINITION TABLE

PRIORITY ↓ (points to CPU column)

| NAME | CPU | | ARGUMENT NAME,TYPE | VARIABLE NAME,TYPE | FILE PU NAME CHAR † | CORRECTION INFORMATION PU NAME,10g | FUNCTION SUMMARY |
|---|---|---|---|---|---|---|---|
| MAX SIZE (BYTE) | 5 | 2 | 2 | 250 | 250 | 55 | 35 | 250 |

| FIG.4A | FIG.4B |

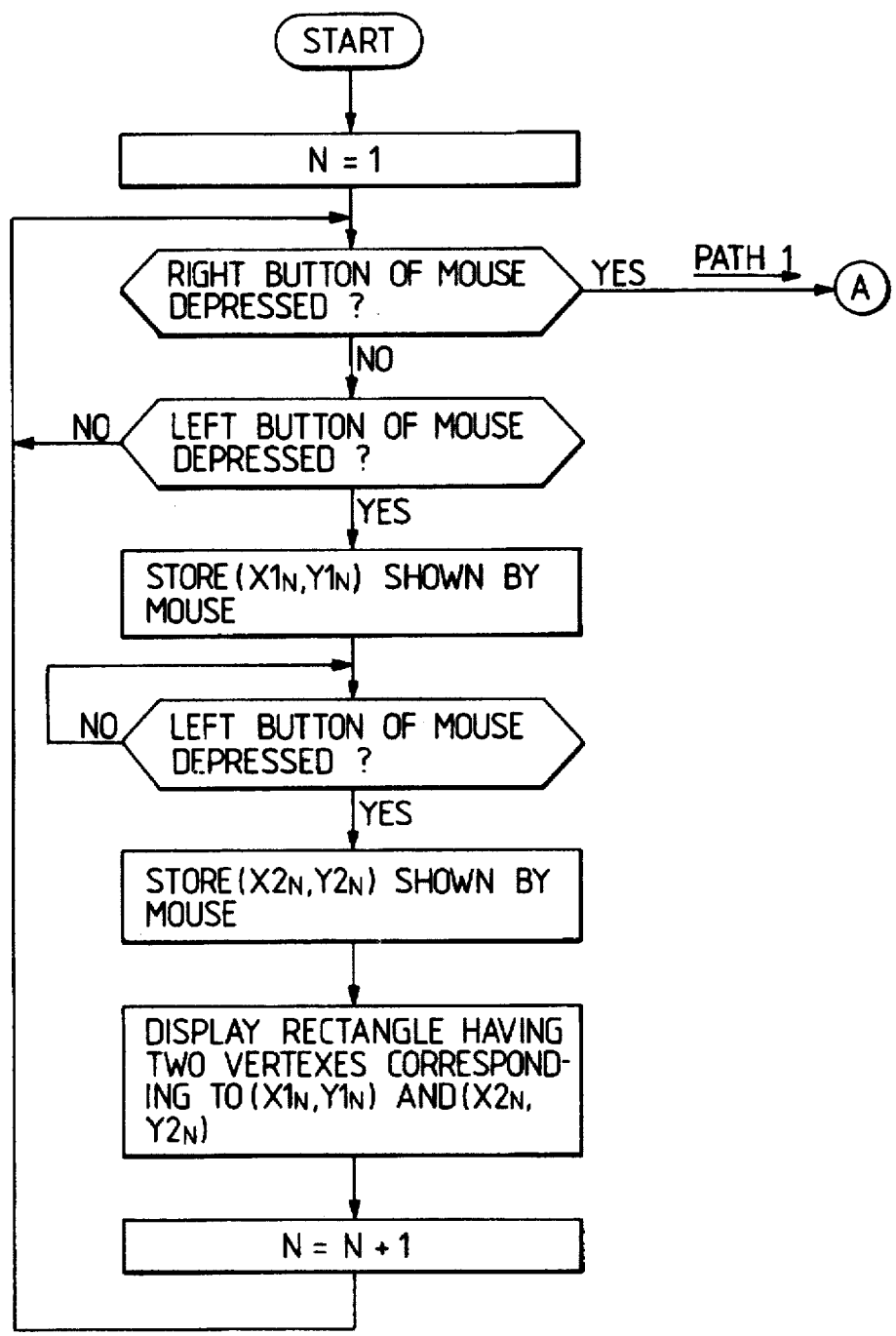

| 1000 | I = 1 |
| 1010 | X(I) = I * I |
| 1020 | I = I + 1 |
| 1030 | IF I > 10 THEN RETURN |
| 1040 | GOTO 1010 |

- 3-4 EVALUATION FORMULA OF SYMBOL "IF"
- 3-4a PIN NUMBER
- 3-1 FRAME OF SYMBOL "IF"
- 3-2 OUTPUT LOGIC ATTRIBUTE
- 3-4b PIN NUMBER
- 3-4d PIN NUMBER
- 3-4c PIN NUMBER
- 3-3 OUTPUT LOGIC ATTRIBUTE

| TYPE OF SYMBOL | POSITION INFORMATION | PIN 1 ATTRIBUTE | PIN 2 ATTRIBUTE | PIN 3 ATTRIBUTE | PIN 4 ATTRIBUTE |
|---|---|---|---|---|---|

(EXAMPLE)

| IF | (200, 300) | IN | — | NOUT | YOUT |
|---|---|---|---|---|---|

FIG. 18

| TYPE OF PATTERN | PATTERN POSITION INFORMATION | ATTACHED INFORMATION | INPUT COUPLED PATTERN INFORMATION | OUTPUT COUPLED PATTERN INFORMATION | |
|---|---|---|---|---|---|
| BOX | STARTING POINT | [INITIALIZATION] | | FIG. 2 | (FIG. 0 DATA) |
| BOX | STARTING POINT | [IDLING] | FIG. 2, FIG. 4, FIG. 10 | FIG. 17 | (FIG. 1 DATA) |
| LINE | STARTING POINT, TERMINAL POINT | [END OF INITIALIZATION] | FIG. 0 | FIG. 1 | (FIG. 2 DATA) |
| BOX | STARTING POINT | [ERROR PROCESS] | FIG. 11, FIG. 12, FIG. 13 | FIG. 4 | (FIG. 3 DATA) |
| LINE | STARTING POINT, TRANSITION POINT, TRANSITION POINT, TERMINAL POINT | [COMPLETION OF ERROR PROCESS] | FIG. 3 | FIG. 1 | (FIG. 4 DATA) |
| BOX | STARTING POINT | [OPERATION START PREPARATION] | FIG. 17 | FIG. 8, FIG. 11 | (FIG. 5 DATA) |
| BOX | STARTING POINT | [IN OPERATION] | FIG. 8, FIG. 16 | FIG. 9, FIG. 12, FIG. 15 | (FIG. 6 DATA) |
| BOX | STARTING POINT | [OPERATION END PROCESS] | FIG. 9 | FIG. 10, FIG. 13 | (FIG. 7 DATA) |
| LINE | STARTING POINT, TERMINAL POINT | [END OF PREPARATION] | FIG. 5 | FIG. 6 | (FIG. 8 DATA) |
| LINE | STARTING POINT, TERMINAL POINT | [END OF OPERATION] | FIG. 6 | FIG. 7 | (FIG. 9 DATA) |
| LINE | STARTING POINT, TRANSITION POINT, TRANSITION POINT, TERMINAL POINT | [COMPLETION OF END PROCESS] | FIG. 7 | FIG. 1 | (FIG. 10 DATA) |
| LINE | STARTING POINT, TRANSITION POINT, TRANSITION POINT, TERMINAL POINT | [ERROR OCCURRENCE] | FIG. 5 | FIG. 3 | (FIG. 11 DATA) |
| LINE | STARTING POINT, TERMINAL POINT | [ERROR OCCURRENCE] | FIG. 6 | FIG. 3 | (FIG. 12 DATA) |
| LINE | STARTING POINT, TERMINAL POINT | [ERROR OCCURRENCE] | FIG. 7 | FIG. 3 | (FIG. 13 DATA) |
| BOX | STARTING POINT | [PAUSE] | FIG. 15 | FIG. 16 | (FIG. 14 DATA) |
| LINE | STARTING POINT, TERMINAL POINT | [PAUSE SW ON] | FIG. 16 | FIG. 14 | (FIG. 15 DATA) |
| LINE | STARTING POINT, TERMINAL POINT | [PAUSE SW OFF] | FIG. 14 | FIG. 6 | (FIG. 16 DATA) |
| LINE | STARTING POINT, TERMINAL POINT | [START SW ON] | FIG. 1 | FIG. 5 | (FIG. 17 DATA) |

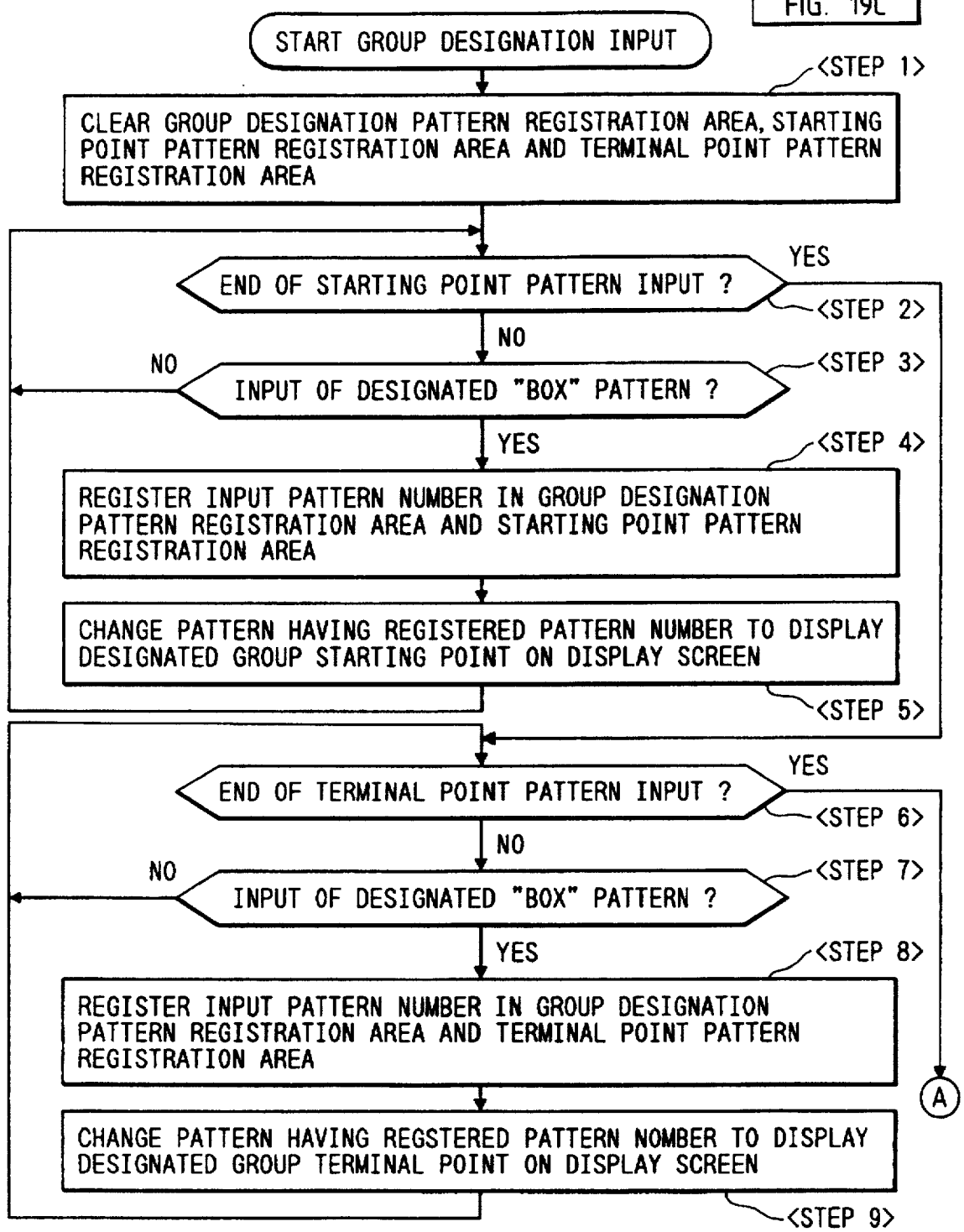

INFORMATION PROCESSING APPARATUS FOR PATTERN EDITING USING LOGIC RELATIONSHIP REPRESENTATIVE PATTERNS

This application is a continuation of application Ser. No. 08/003,935 filed Jan. 21, 1993, now abandoned, which is a continuation of application Ser. No. 07/373,105 filed Jun. 29, 1989, abandoned.

BACKGROUND OF THE INVENTION

1. Field of the Invention

The present invention relates to an information processing apparatus for editing program symbols in a flow chart format to create a program.

2. Related Background Art

Conventionally, when a control program of a given apparatus is to be created, the specification manual of the apparatus is written, and data required for control in the apparatus are adjusted. A control flow is illustrated in a chart, a program is designed based on the control flow chart, and coding is then performed. Software specialists are in charge of the program design and coding. However, previous arrangements must be made for, e.g., a control algorithm of the apparatus with persons who are not skilled in the control program, e.g., hardware specialists. As a result of previous arrangements, the control algorithm is determined, coding is performed, and the presence/absence of errors is checked. If an error is found, the program is often corrected or changed. In actual correction, since source codes of the program are corrected to obtain practical effects, the host flow chart or the software specification manual is not often changed. For this reason, actual codes do not coincide with those in a manual describing the algorithm, and this poses a problem in later re-checking or general meeting with hardware specialists or the like.

In order to group-designate a group of patterns (figures) in a conventional system, a method of designating all the patterns to be group-designated one by one to form a designated group and an apparatus for designating a rectangular area for the designated group of all the patterns in the designated area are known.

Furthermore, in a chart (e.g., a flow chart), a logic attribute, e.g., "YES" or "NO" is assigned to an output of a symbol (e.g., an if-statement). When the symbol having the logic attribute at its output is edited on a pattern editing apparatus such as a CAD system, whether the logic attribute of "YES" or "NO" is assigned to the output of the symbol must be determined when the symbol is input. Upon determination of the logic attribute, the logic attributes are independently determined for each of the outputs in a conventional system.

Furthermore, in a conventional two-dimensional drawing editing system, when two points are to be connected, the two points are connected by a straight line, or when a junction point of the two points is to be designated, the junction point and the two points are connected through polygonal lines having the junction point as a vertex.

Conventionally, a pattern editing technique using multi-windows is known. In this technique, a frame is split in advance in correspondence with a plurality of different editing objects or with areas for operation instructions alternatively, an editor may set areas capable of overlapping each other, so that the corresponding areas are assigned to the objects to perform display/editing processing. In a technique of splitting a frame so that areas do not overlap each other (to be referred to as a "frame splitting technique" hereinafter), since display areas are preset in correspondence with objects, an operator can observe all the objects on the screen, and operates a mouse or the like to move a character cursor to a corresponding region to select a desired object. On the other hand, in a method capable of setting areas which can overlap each other (to be referred to as a "frame overlapping technique" hereinafter), an editor can set and display a new area having an arbitrary size at an arbitrary position on a screen at a desired timing, and can make the setting so that a plurality of areas completely conceal another area. The area concealed by other areas can be selected such that a frame priority change key prepared in advance is repetitively operated to display a desired area on a top layer.

In a document or pattern editing apparatus, when a document or a pattern is input or edited, if the entire image of an input document or pattern is to be observed, a display form of a display device (e.g., a display magnification) must be switched between a document/pattern input/editing mode and a mode for displaying the entire image due to the limitation on size of the display device. As a method of switching the display form, inputting a command from a keyboard and selecting an item from an operation menu using a mouse are proposed.

In a flow chart in software development or in a circuit diagram in hardware developments, it is often difficult to convey the purpose of design to persons other than a designer by using only a flow chart or circuit diagram. For this reason, notes are often written in drawings. In some cases, explanatory views are attached to clarify the purpose of design. Recently, CAD system have become becoming popular. In such a system, a drawing is edited on a display, and a computer automatically converts pattern information into character code information such as program or circuit connection information.

SUMMARY OF THE INVENTION

It is an object of the present invention to provide an information processing apparatus comprising:

pattern editing means for editing program symbols in a flow chart format to create a program network chart;

combination symbol storage means for storing a combination of the program symbols as one symbol;

condition storage means for storing conditions of an apparatus for executing a program represented by the program network chart;

conversion means for converting the symbol read out from the combination symbol storage means into codes; and means for executing the codes converted by the conversion means.

It is another object of the present invention to provide an information processing apparatus for storing pattern information and displaying the stored pattern information on display means, comprising:

designation means for designating an area on the pattern information displayed on the display means;

judging means for judging whether or not the pattern information is present in the area designated by the designation means; and conversion means for converting the pattern information which is judged by the judging means to be present outside the area into character code information.

It is still another object of the present invention to provide an information processing apparatus for connecting points with lines using a position coordinate detector in order to draw a two-dimensional pattern (drawing) on a display device, comprising:

means for storing coordinates of a point designated by the position coordinate detector;

means for determining polygonal lines on the basis of coordinates of a total of three points of a previously designated point, a point designated before the previously designated point, and a position designated by the position coordinate detector at that time; and means for displaying the determined lines on a display screen.

It is still another object of the present invention to provide a pattern editing apparatus capable of displaying areas corresponding to a plurality of editing objects to partially overlap each other, comprising:

storage means for storing the number of the plurality of editing objects;

shift value storage means for storing shift values for respectively shifting the plurality of editing objects;

input means for inputting a new editing object; and means for updating a display position of the new editing object from the input means and the shift value of the shift value storage means on the basis of the shift value of the shift value storage means and the number of objects stored in the storage means.

It is still another object of the present invention to provide a pattern editing apparatus comprising:

input means for inputting chart information representing a chart;

display control means for causing to display the chart on the basis of the chart information input from the input means;

attribute input means for inputting one of logic attributes for the chart displayed by the display control means;

determination means for determining other logic attributes of the chart on the basis of the logic attributes input from the attribute input means; and control means for causing to display the logic attribute information on the displayed chart in response to the determination means and the attribute input means.

It is still another object of the present invention to provide a pattern editing apparatus comprising:

designation means for designating a plurality of patterns to serve as an object for each editing processing;

retrieving means for retrieving a pattern having a relationship for logically coupling the designated patterns; and means for, when a corresponding pattern is present, adding the corresponding pattern as the object pattern of the editing processing.

It is still another object of the present invention to provide a display apparatus comprising:

instruction input means for inputting a selection instruction of one of a plurality of display forms;

storage means for storing information to be displayed; and display control means for displaying the information to be displayed of the storage means in a first display form in response to one instruction of the instruction input means, and displaying the information to be displayed of the storage means in a second display form different from the first display form in response to another instruction of the instruction input means.

The above and other objects of the present invention will be apparent from the description of the preferred embodiments taken in conjunction with the accompanying drawings.

BRIEF DESCRIPTION OF THE DRAWINGS

FIG. 3 shows an architecture of a data base;

FIG. 6 is a block diagram showing the relationship between FIGS. 6A and 6B;

FIGS. 6A and 6B are flow charts together showing a basic algorithm of the embodiment shown in FIG. 5A;

FIG. 18 is a table showing internal expression data shown in FIG. 17;

FIG. 19 is a block diagram showing the relationship between FIGS. 19A, 19B, and 19C;

FIGS. 19A, 19B and 19C are a processing flow chart together showing the embodiment shown in FIG. 15;

DETAILED DESCRIPTION OF THE PREFERRED EMBODIMENTS

Figure 1:
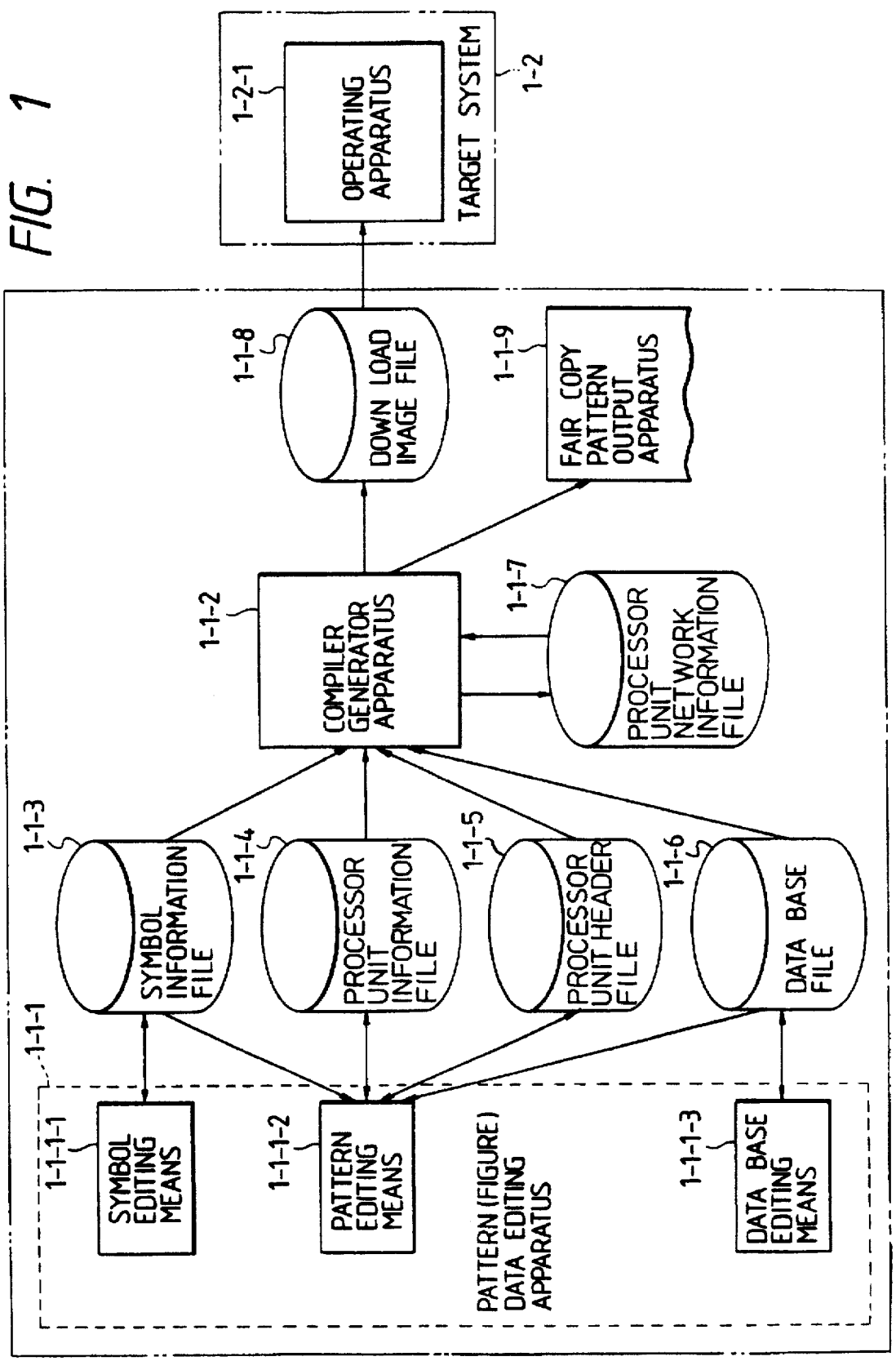
FIG. 1 is a diagram showing a structure of the present invention.

FIG. 1 shows the characteristic feature of the present invention. When an information processing apparatus is expressed functionally, it comprises a pattern (figure) data editing apparatus 1-1-1, a compiler generator apparatus 1-1-2, a symbol information file 1-1-3, a Processor unit information file 1-1-4, a Processor unit header file 1-1-5, a data base 1-1-6, a Processor unit network information file 1-1-7, a download image file 1-1-8, a fair copy pattern output apparatus 1-1-9, and an operating apparatus 1-2-1 constituted on a target system 1-2.

Figure 2:
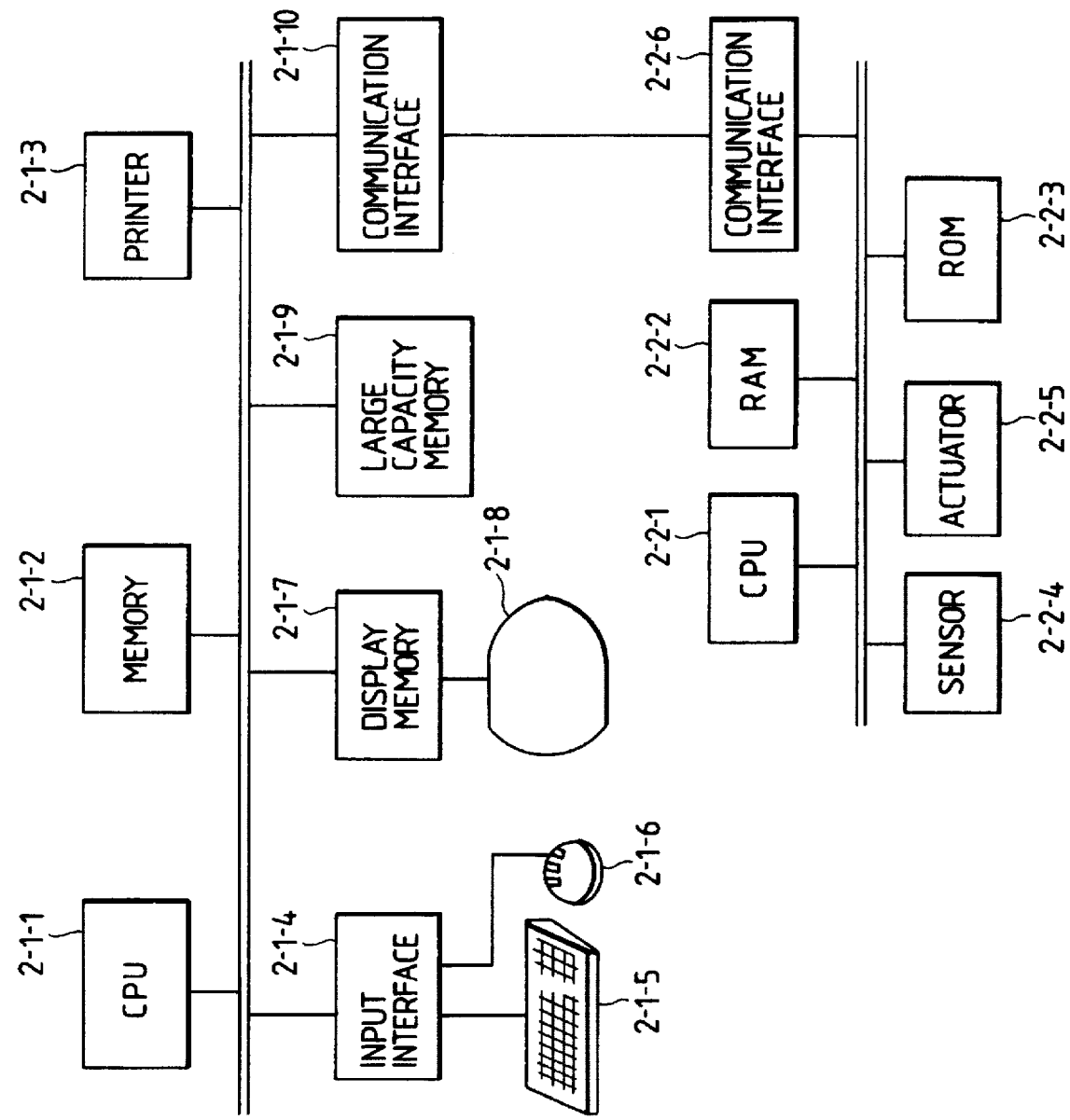
FIG. 2 is a diagram showing an arrangement of the present invention.
Figures 4, 4A:
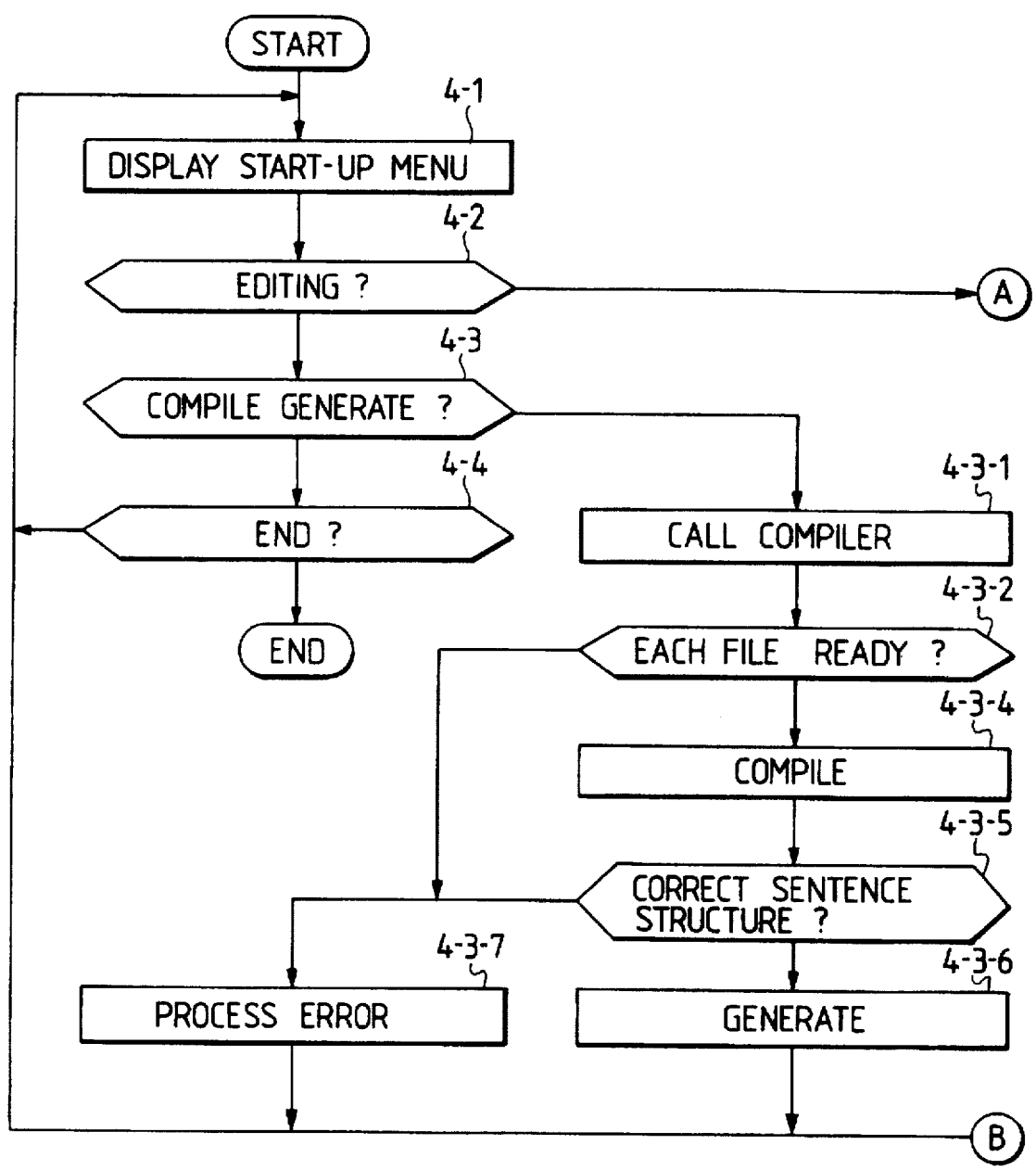
FIG. 4 is a block diagram showing the relationship between FIGS. 4A and 4B.
FIGS. 4A and 4B are a flow chart together showing an operation of the present invention.

FIG. 2 is a diagram showing a hardware arrangement of the present invention shown in FIG. 1. A software program of the pattern data editing apparatus 1-1-1, e.g., a control procedure shown in FIG. 4, is stored in a large capacity memory 2-1-9. When the program is used, it is called to a memory 2-1-2. The operation of the pattern data editing apparatus 1-1-1 is performed such that when an operator inputs data using a keyboard 2-1-5 and a mouse 2-1-6, the data is input through an input interface 2-1-4, and is displayed on a display device 2-1-8 through a display memory 2-1-7. The compiler generator apparatus 1-1-2 is stored in the large capacity memory 2-1-9. Upon execution of this apparatus, it is called to the memory 2-1-2 and executed by a CPU 2-1-1.

The symbol information file 1-1-3, the Processor unit information file 1-1-4, the Processor unit header file 1-1-5, the data base 1-1-6, the Processor unit network information file 1-1-7, and the download image file 1-1-8 are also created in the large capacity memory 2-1-9.

The fair copy pattern output apparatus 1-1-9 uses a printer 2-1-3 as its output means.

The target system 1-2 is constituted by the CPU 2-2-1, a RAM 2-2-2, a ROM 2-2-3, a sensor 2-2-4, and an actuator 2-2-5. The download image file 1-1-8 is called to the RAM 2-2-2 through a communication interface 2-1-10 of a developing system 1-1 and a communication interface 2-2-6 of the target system 1-2, and is then executed.

A control program is input and edited by a symbol editing means 1-1-1-1, a pattern editing means 1-1-1-2, and a data base editing means 1-1-1-3.

The symbol editing means 1-1-1-1 is a means for converting a portion having a control structure as a combination of basic symbols or macrosymbols as a combination of basic symbols into a symbol (macro) and registering the symbol. The basic symbols and the macrosymbols are registered in the symbol information file 1-1-3.

The pattern editing means 1-1-1-2 arranges and connects the basic symbols and macrosymbols to indicate a control flow, thus creating a program. The created program is registered in the Processor unit information file 1-1-4 and the Processor unit header file 1-1-5.

The data base editing means 1-1-1-3 is a table editor, and registers and updates non-time-series data such as I/O addresses, memory assignment, or the like of an apparatus to be developed. The non-time-series data include (1) a global variable definition table, (2) an I/O definition table, (3), an interruption definition table, (4), an event definition table, (5) a character train macro-definition table, (6) a structure definition table. These tables are registered in the data base file 1-1-6. FIG. 3 shows these data base files.

A compiler of the compiler generator apparatus 1-1-2 expands the content of the Processor unit information file 1-1-4, e.g., a symbol written by a macrosymbol into a set of basic symbols with reference to the content of the symbol information file 1-1-3, and expands a macro-defined character train with reference to the character train macro-definition table (5) in the data base file 1-1-6.

Resultant information of symbols is pursued on the basis of Processor unit information obtained by expanding symbols (macro) and character trains (macro) to extract logical connections of a program flow, thus creating the Processor unit network information file 1-1-7. A generator converts the content of the Processor unit network information file 1-1-7 into the download image file 1-1-8 supplied to the operating apparatus 1-2-1 of the target system 1-2 with reference to the definition by the data base file 1-1-6. On the other hand, when the compiler does not find an error within its knowledge as a result of analysis of the Processor unit information file 1-1-4 upon instruction of a flag, it outputs the file to the fair copy pattern output apparatus 1-1-9 as a Processor unit pattern.

The operating apparatus 1-2-1 on the target system 1-2 executes the download image. For a code which requires execution involving a plurality of CPUs as an execution environment, the operating apparatus 1-2-1 communicates with an operating apparatus 1-2-1' (not shown) present in another CPU to cooperate a process unit in the CPU. The operating apparatus 1-2-1 prepares a debugging command processing routine, and can have a means for informing a debugging command generator of a PU state in the CPU and a data value in response to the external debugging command.

Figure 4B:
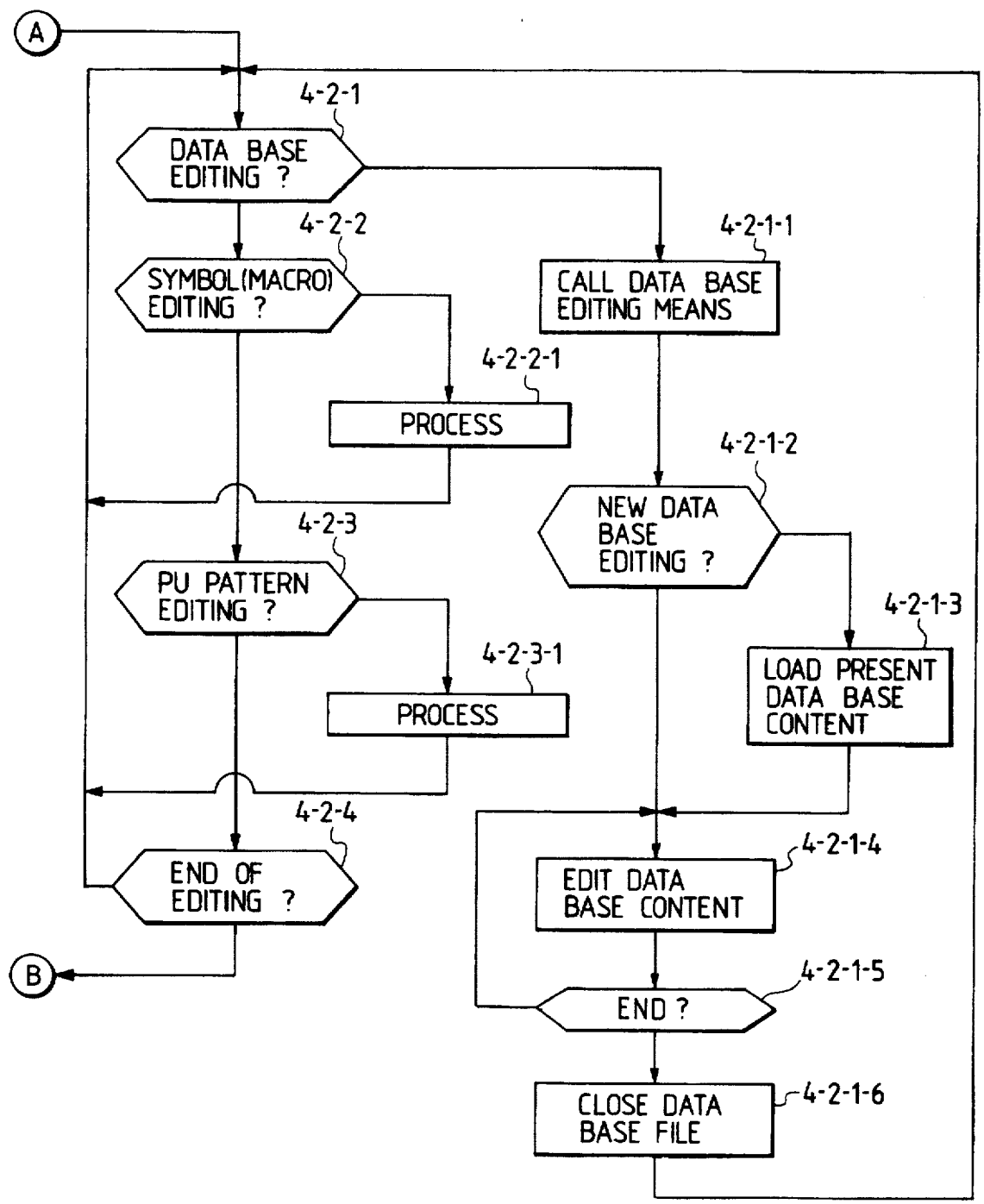

The operation of the apparatus according to this embodiment will be described below with reference to the flow chart shown in FIGS. 4A and 4B.

The system displays a start-up menu in step 4-1, and waits for an input. It is checked in step 4-2 if an operator instructs editing. If YES in step 4-2, it is checked in step 4-2-1 if the editing is data base editing. If YES in step 4-2-1, the data base editing means is called in step 4-2-1-1, and it is checked in step 4-2-1-2 if a new data base is created. If NO in step 4-2-1-2, the storage content of the data base is loaded in step 4-2-1-3. In step 4-2-1-4, the content of the data base is rewritten. This step is repeated until editing of all the items is ended (judgment in step 4-2-1-5). If YES in step 4-2-1-5, the edited file is stored in step 4-2-1-6, and the flow returns to the start-up menu. If NO in step 4-2-1, the flow advances to step 4-2-2 to check if the editing is that of symbols (macro). If YES in step 4-2-2, the symbol (macro) editing means is called to execute steps similar to those for data base editing, thus ending symbol (macro) editing processing.

If NO in step 4-2-2, the flow advances to step 4-2-3 to check if the editing is Processor unit pattern editing. If YES in step 4-2-3, processing for the Processor unit pattern editing is performed as in the data base editing and symbol (macro) editing.

If NO in step 4-2-3, the flow advances to step 4-2-4 to check if the editing is ended. If NO in step 4-2-4, the type of editing instructed by the operator is checked again. If YES in step 4-2-4, the flow returns to step 4-1 to display the start-up menu. If it is determined in step 4-3 that the compiler is to be generated, the compiler generator apparatus 1-1-2 is called (step 4-3-1). The compiler generator apparatus 1-1-2 checks in step 4-3-2 if all the necessary files are ready. If NO in step 4-3-2, the apparatus executes error processing step 4-3-7 to inform a message indicating this, and the flow returns to step 4-1 to display the start-up menu. If YES in step 4-3-2, the compiler expands the macrosymbols with reference to the symbol information file, and expands character trains (macro) with reference to the character train macro-definition table. Thereafter, the compiler extracts logic connections of a program flow, and creates the Processor unit network information file 1-1-7 (step 4-3-4). In this case, it is checked in step 4-3-5 if connections among symbols are correct, if character trains are significant, and the like. If an error is found, error processing (step 4-3-7) for displaying a message indicating that a sentence structure is not correct is performed, and the flow returns to step 4-1 to display the start-up menu.

If YES in step 4-3-5, the generator is started up, converts the file into execution codes in units of CPUs, creates corresponding files, and the like. Thereafter, the flow returns to the start-up menu.

If NO in step 4-3, it is checked in step 4-4 if processing is ended. If YES in step 4-3, the processing is ended; otherwise, the flow returns to the start-up menu.

Although not explained in the above description, if it is determined in step 4-3-5 that the sentence structure is correct, a fair copy of a Processor unit pattern data base file may be formed and output in place of generating the execution codes.

According to the present invention, an information processing apparatus comprises a pattern editing means for editing program symbols in a flow chart format to create a program network chart, a combination symbol storage means for storing a combination of the program symbols as one symbol, a condition storage means for storing conditions of an apparatus for executing a program represented by the program network chart, a conversion means for converting the symbol read out from the combination symbol storage means into codes; and a means for executing the codes converted by the conversion means. Thus, a control program can be written in an environment where processing is represented by a pattern symbol, and its connection relationship can be visually and easily understood. Thus, system development which makes communication between a software specialist and mechanical and electrical engineers difficult in a conventional system can be facilitated. Even if the program is rewritten and changed repetitively, the correspondence between a PU pattern and a target code is not disordered. Since the PU pattern is continuously updated, program quality can be improved.

Symbols to be edited may be registered and edited as symbols for the Petri net and the like.

Figure 5A:
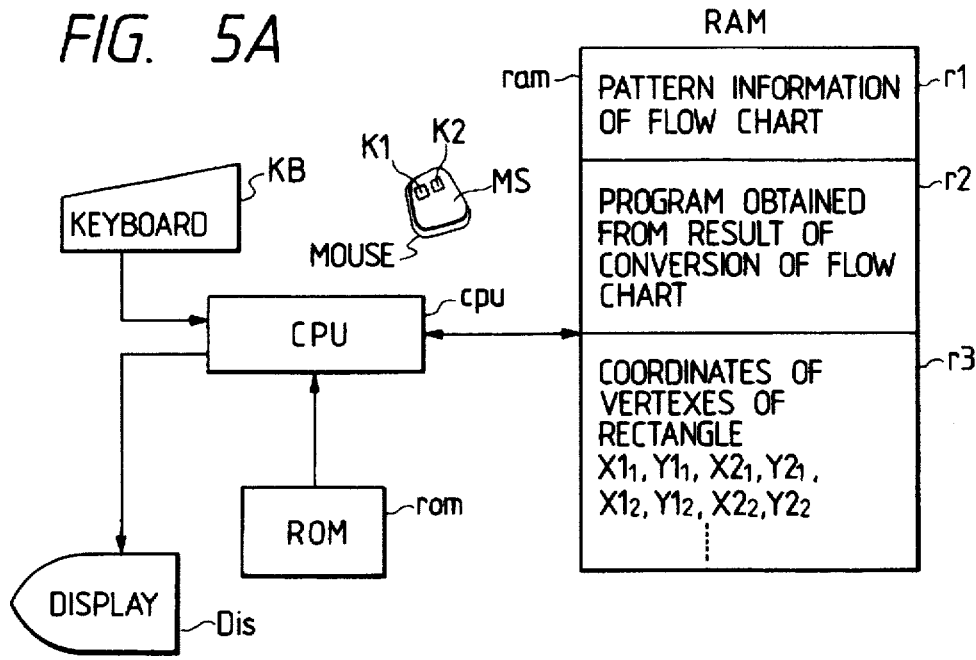
FIG. 5A is a block diagram of another system for embodying the present invention.

FIG. 5A is a block diagram showing another embodiment of the present invention. In FIG. 5A, a keyboard KB as an input means has letter keys, numerical keys, symbol keys, control keys, cursor shift keys, and the like, and inputs pattern information, character information, and the like.

A mouse MS as a coordinate input means moves a cursor, and has a button K1 for inputting a position designated by the cursor and an instruction button K2 for processing information designated by the cursor.

A processing unit CPU processes information in accordance with a control sequence of a program stored in a memory (to be described later).

A display Dis displays characters, patterns, and the like. A memory ROM stores a procedure for converting pattern information into a BASIC language and a processing procedure for judging an area shown in FIG. 6B.

A memory RAM has an area r1 for storing pattern information, an area r2 for storing a program as a result of conversion from the pattern information, an area r3 for storing vertexes of a rectangle, and the like.

Figure 5B:
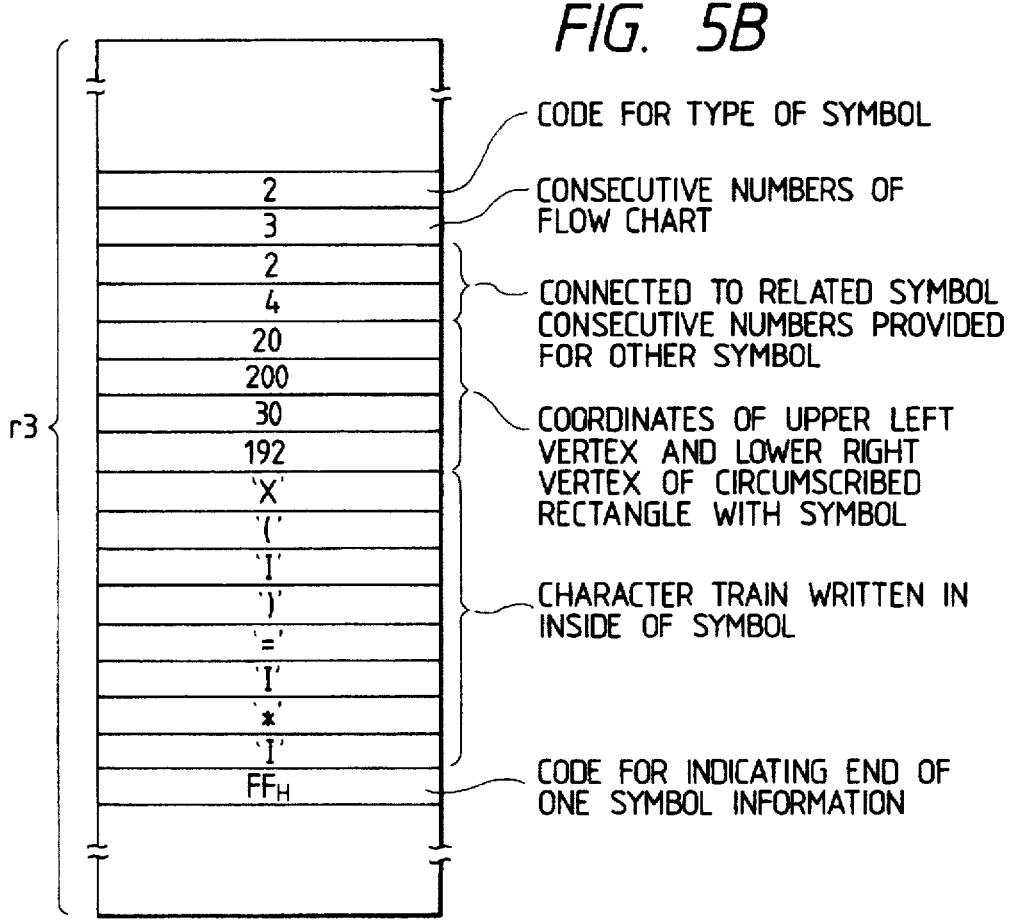
FIG. 5B shows a storage format of pattern information.

In this embodiment, pattern information is a flow chart, and character code information as a result of conversion of the pattern information is a program written in the BASIC language. The shape of a region is a rectangle. When the upper left vertex and the lower right vertex of the rectangle are selected by the mouse, the rectangular region is designated. Note that the pattern information of the flow chart is stored in a format shown in FIG. 5B.

A description will now be made with reference to FIGS. 5A, 5B, 6A and 6B.

Figures 7, 8:
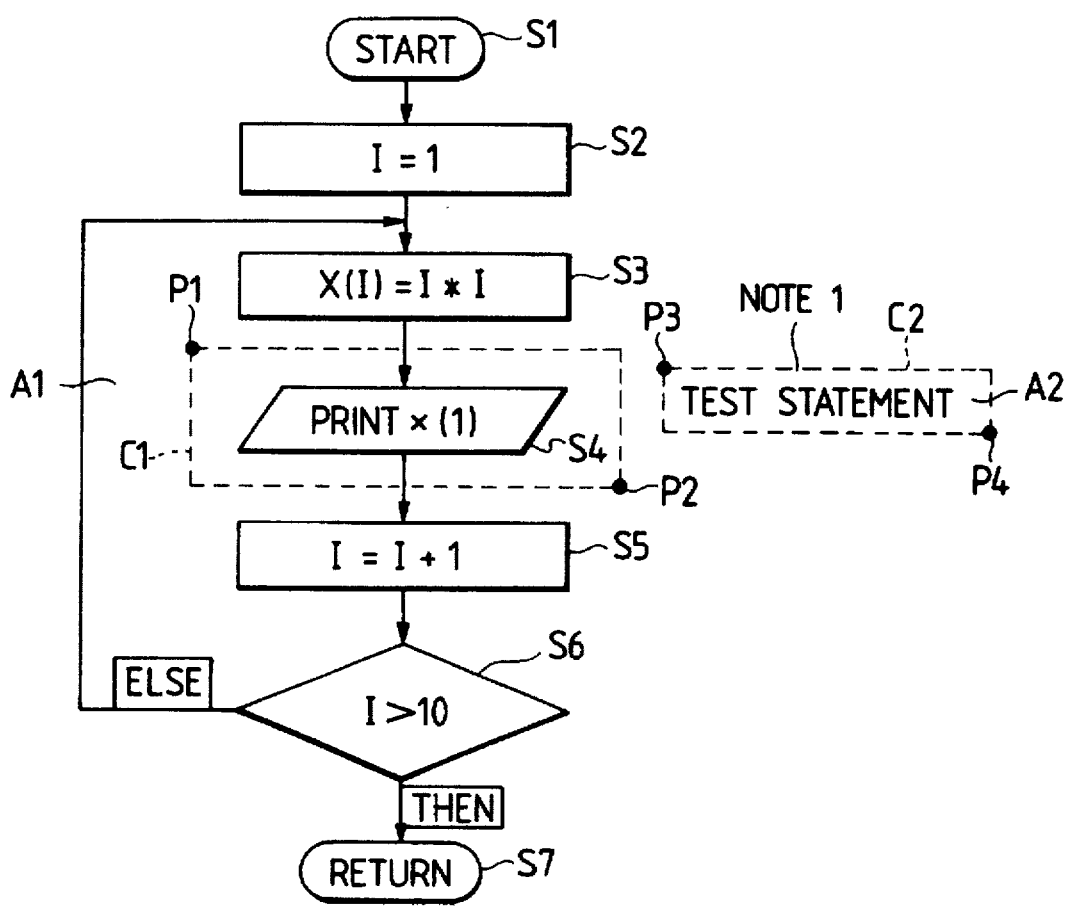
FIG. 7 is a flow chart illustrating conversion of a flow chart to program according to the embodiment shown in FIG. 5A.
FIG. 8 illustrates a conversion output as a program listing.
Figure 9:
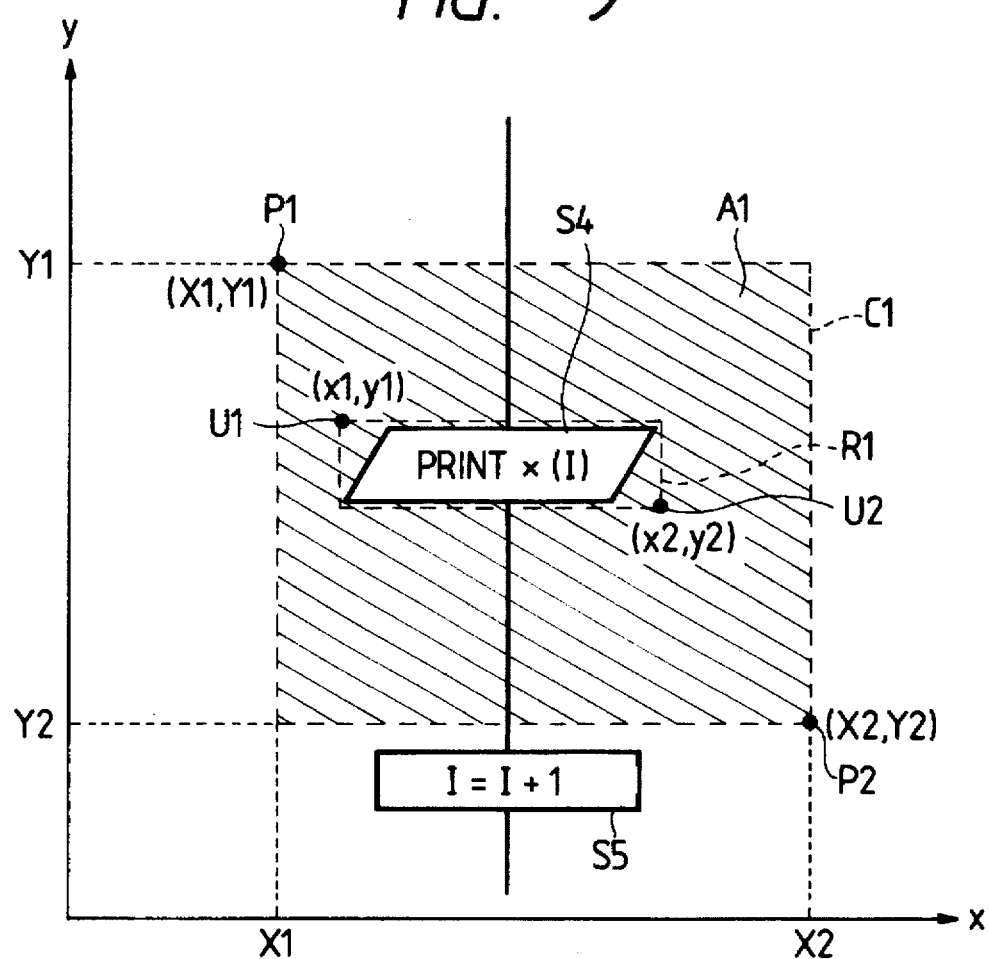
FIG. 9 is a graph explanatory of a method of judging whether a symbol is present inside or outside a rectangular region.

Assume that a flow chart is already input to the memory RAM by an input means (not shown), and a sentence as a note is also already input. If the right button K2 of the mouse MS is depressed, a path 1 is selected, the flow chart stored in the memory RAM is converted to a BASIC program in accordance with the procedure stored in the memory ROM, and the converted program is stored in the area r2 in the memory RAM. Rules for converting symbols in the flow chart into BASIC statements will be described later. When the left button K1 is depressed, it is recognized that the upper left vertex of the rectangular region is designated. Coordinate values $X1_N$ and $Y1_N$ indicated by the mouse MS are stored in the area r3 of the memory RAM. When the left button K1 is successively depressed, it is recognized that the lower right vertex of the rectangular region is designated. Coordinate values $X2_N$ and $Y2_N$ indicated by the mouse MS are stored in the area r3 of the memory RAM, and a rectangle which has the two points $(X1_N, Y1_N)$ and $(X2_N, Y2_N)$ as two opposing vertexes and in which opposite sides are parallel or adjacent sides are perpendicular to each other is drawn on the display Dis, as shown in FIGS. 7 and 9. In this case, N is a variable which has an initial value "1" and is incremented by "1" every time a rectangular region is input. When a plurality of rectangular regions are to be input, the similar operation is repeated. Thus, an arbitrary number of rectangular regions can be input. FIG. 7 shows a state wherein two rectangular regions A1 and A2 are input as described above.

After the rectangular regions are input, the right button K1 of the mouse MS is depressed to select the path 1, so that the flow chart is converted to a BASIC program. Upon conversion, symbols in the flow chart are evaluated one by one to check if the rectangular region includes a symbol. If evaluation of all the symbols is completed, the conversion operation in this embodiment is ended.

Rules for converting a single symbol in the flow chart into a statement in a program written in the BASIC language are as follows.

(1) A statement number of the start statement is determined by a proper method, e.g., by inputting it from a keyboard.

(2) Each of the statement numbers of the second and subsequent statements is incremented by "10".

(3) In the case of a symbol other than an oval or rhombic symbol, a character train written inside the symbol is directly used as a statement.

(4) The starting oval symbol is ignored.

(5) In the case of the rhombic symbol, two statements are generated as follows.

A. A first statement is formed by coupling the following character trains:

(a) IF (b) a character train written inside the rhombic symbol (c) THEN (d) a statement number of a statement corresponding to a symbol coupled to one labeled as "THEN" of two exits of the rhombic symbol. If "RETURN" is written inside the symbol coupled to the exit labeled as "THEN", "RETURN" is coupled.

B. A second statement is a GOTO statement directed to a statement corresponding to a symbol coupled to an exit labeled as "ELSE".

(6) If the last oval symbol is not evaluated, "RETURN" or "END" written in this symbol is attached to the end of the program as a single statement.

Figure 6B:
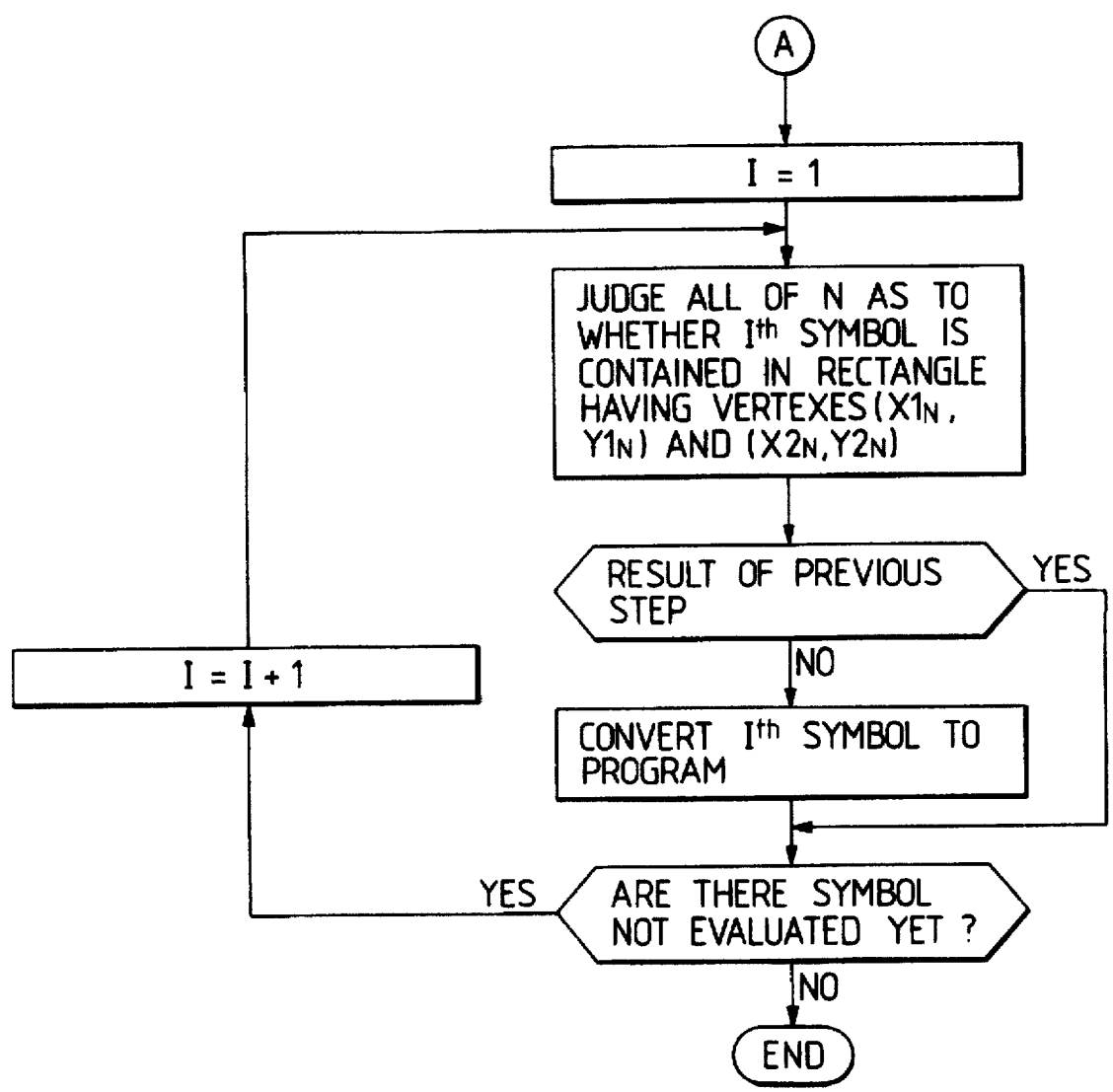

Control for judging whether a symbol in the flow chart is present inside or outside the rectangular region will be described below with reference to FIG. 9. FIG. 9 is an enlarged view of a portion near a symbol S4 in FIG. 7. Assume that two vertexes P1 (X1,Y1) and P2 (X2,Y2) are indicated by the mouse MS and a rectangle C1 is displayed on the display Dis. A method of judging whether or not the symbol S4 is present inside a rectangular region A1 is shown. As shown in FIGS. 6A and 6B, pattern information of a symbol includes coordinates of upper left and lower right vertexes of a rectangle which circumscribes the symbol. A rectangle circumscribing the symbol S4 is represented by R1, its upper left vertex is represented by U1 (x1,y1), and its lower right vertex is represented by U2 (x2,y2). If it is determined that the symbol S4 is present inside the rectangular region A1 when the rectangle R1 is completely included inside the rectangle C1, conditions to be judged are as follows as can be seen from FIG. 9:

If x1>X1 and x2<X2 and y1<Y1 and y2>Y2, then the symbol S4 is present inside the rectangular region A1. If these conditions are not satisfied, the symbol is present outside the rectangular region. This judging method can be generally applied.

FIG. 8 shows a program as a result of conversion of a flow chart shown in FIG. 7 by the above-mentioned method.

Figure 10:
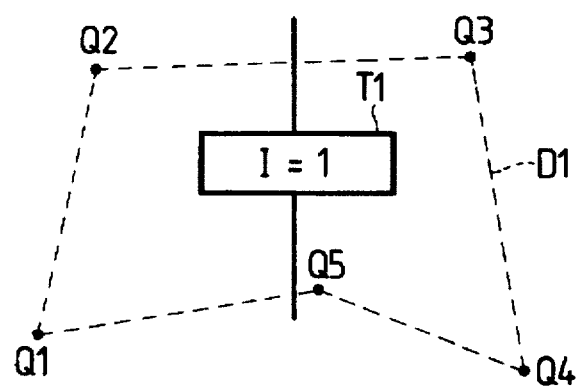
FIG. 10 is a graph explanatory of an example of designating an area using an arbitrary polygon.

In this embodiment, the region has a rectangular shape, and is designated by pointing two vertexes of a rectangle. Alternatively, a region surrounded by a concave polygon D1 shown in FIG. 10 may be designated. In FIG. 10, a symbol T1 surrounded by vertexes Q1 to Q5 does not serve as an object of conversion to character code information. Judgment of the inside/outside of an arbitrary polygon is conventionally performed when a portion inside a pattern is painted in the field of computer graphics, and a description of a detailed method will be omitted.

As described above, a curve surrounding a portion of a note, a portion of an explanatory view, or an effective portion in a debugging mode need only be input from an input device such as a mouse, so that these portions are allowed not to serve as objects of conversion to character code information. A designer can fill a note or explanatory view in a desired portion of a drawing, and can draw a design drawing which is easy to understand.

Figure 11:
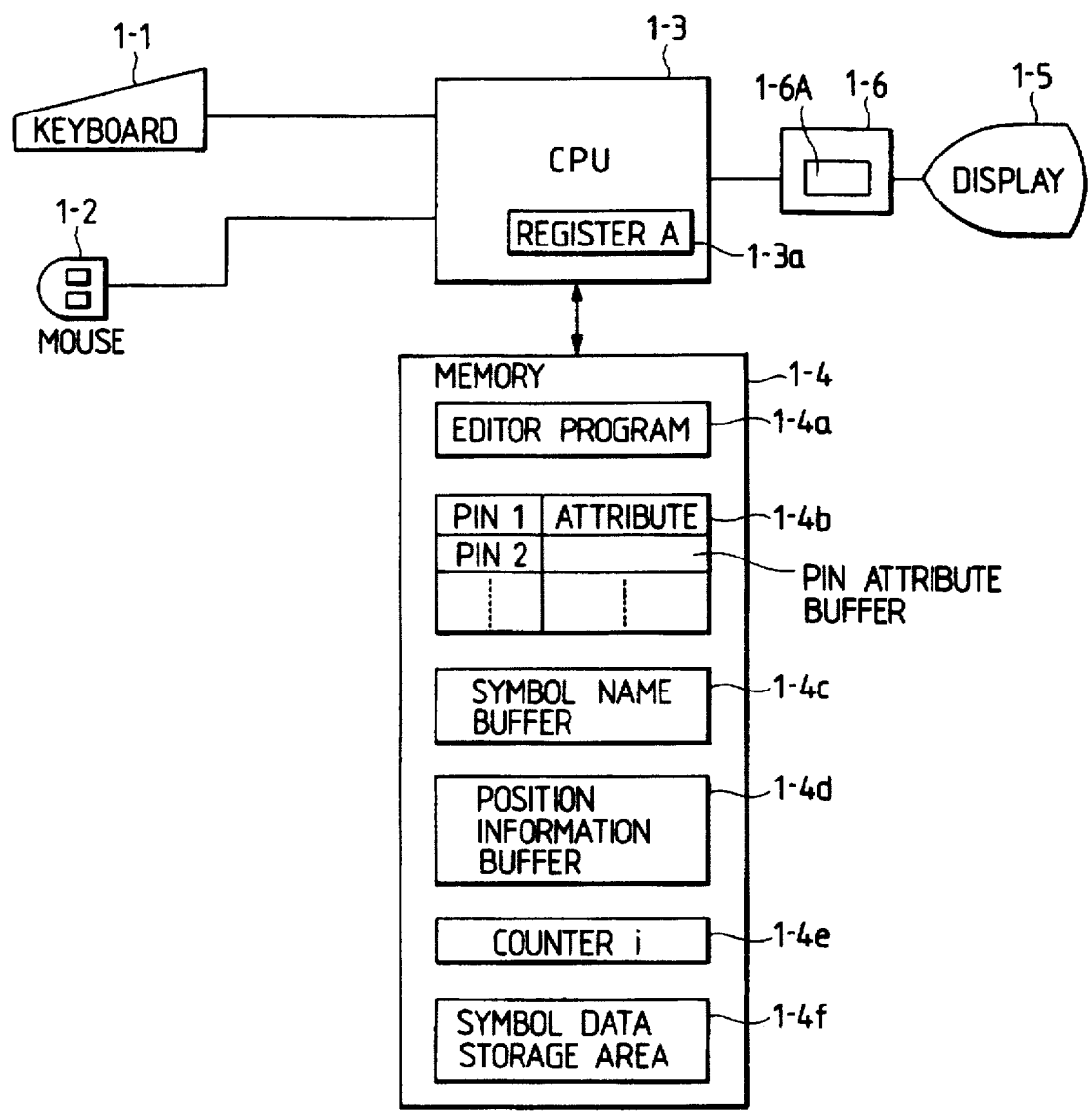
FIG. 11 is a block diagram showing still another embodiment of the present invention.
Figures 12, 12A:
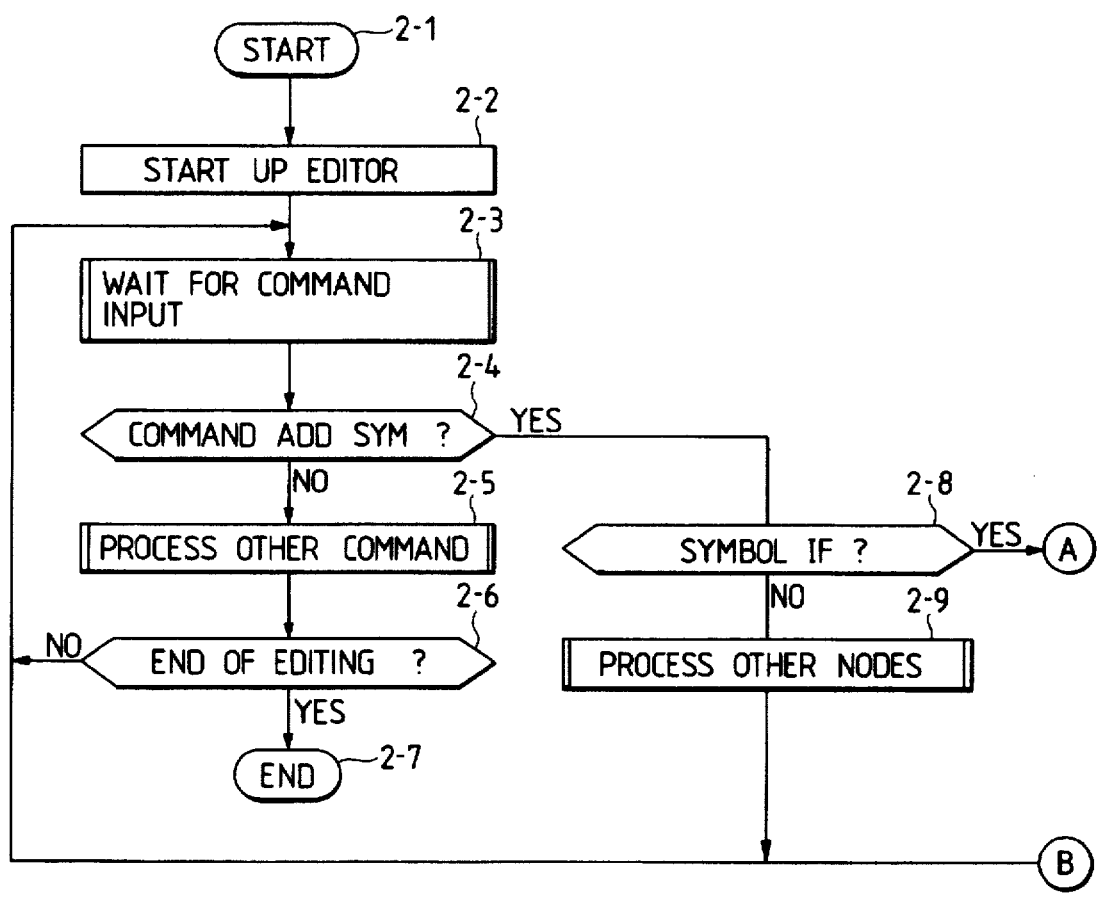
FIG. 12 is a block diagram showing the relationship between FIGS. 12A, 12B, and 12C.
FIGS. 12A, 12B and 12C are flow charts together showing the embodiment shown in FIG. 11.
Figure 12B:
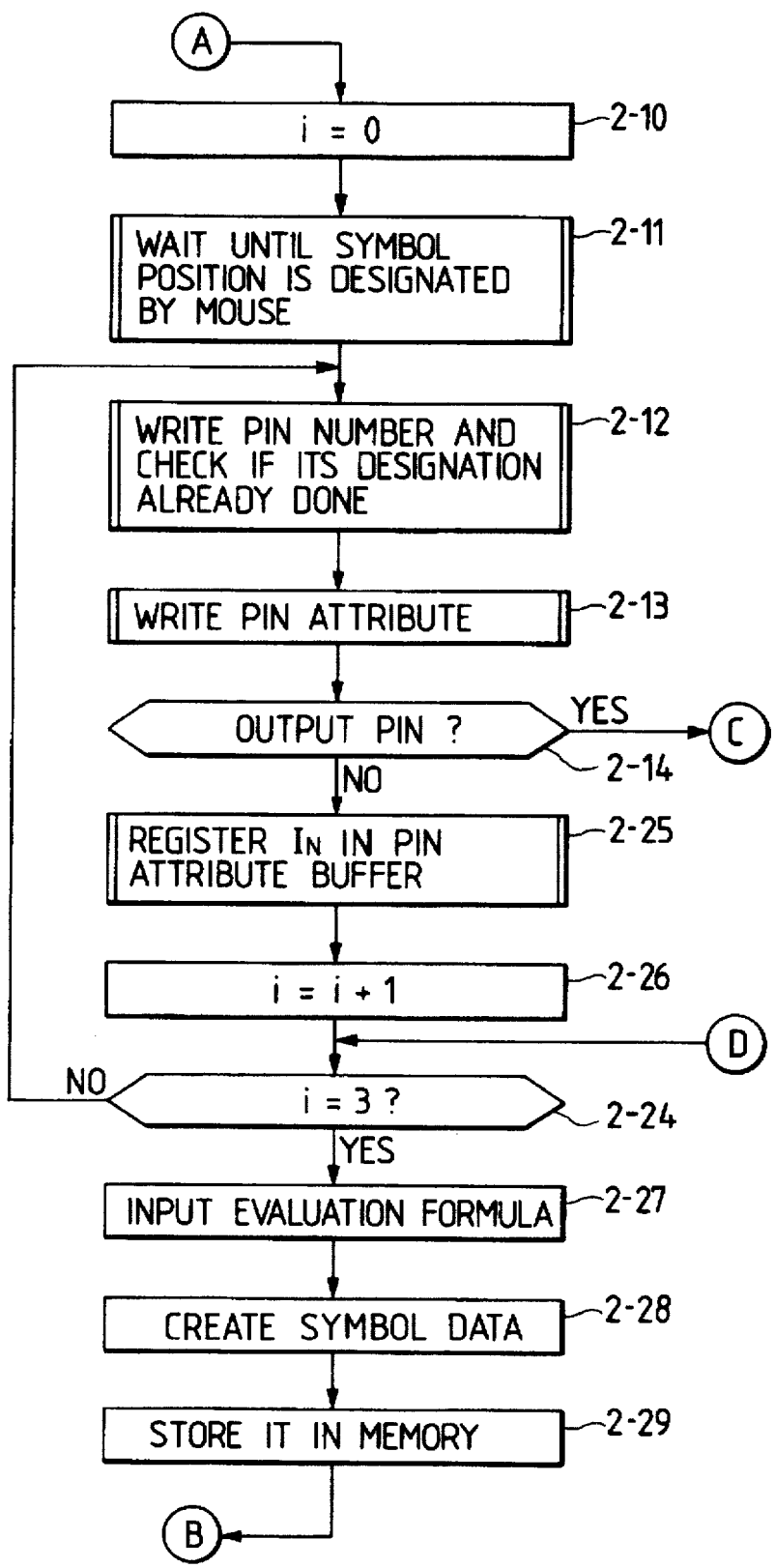
Figure 12C:
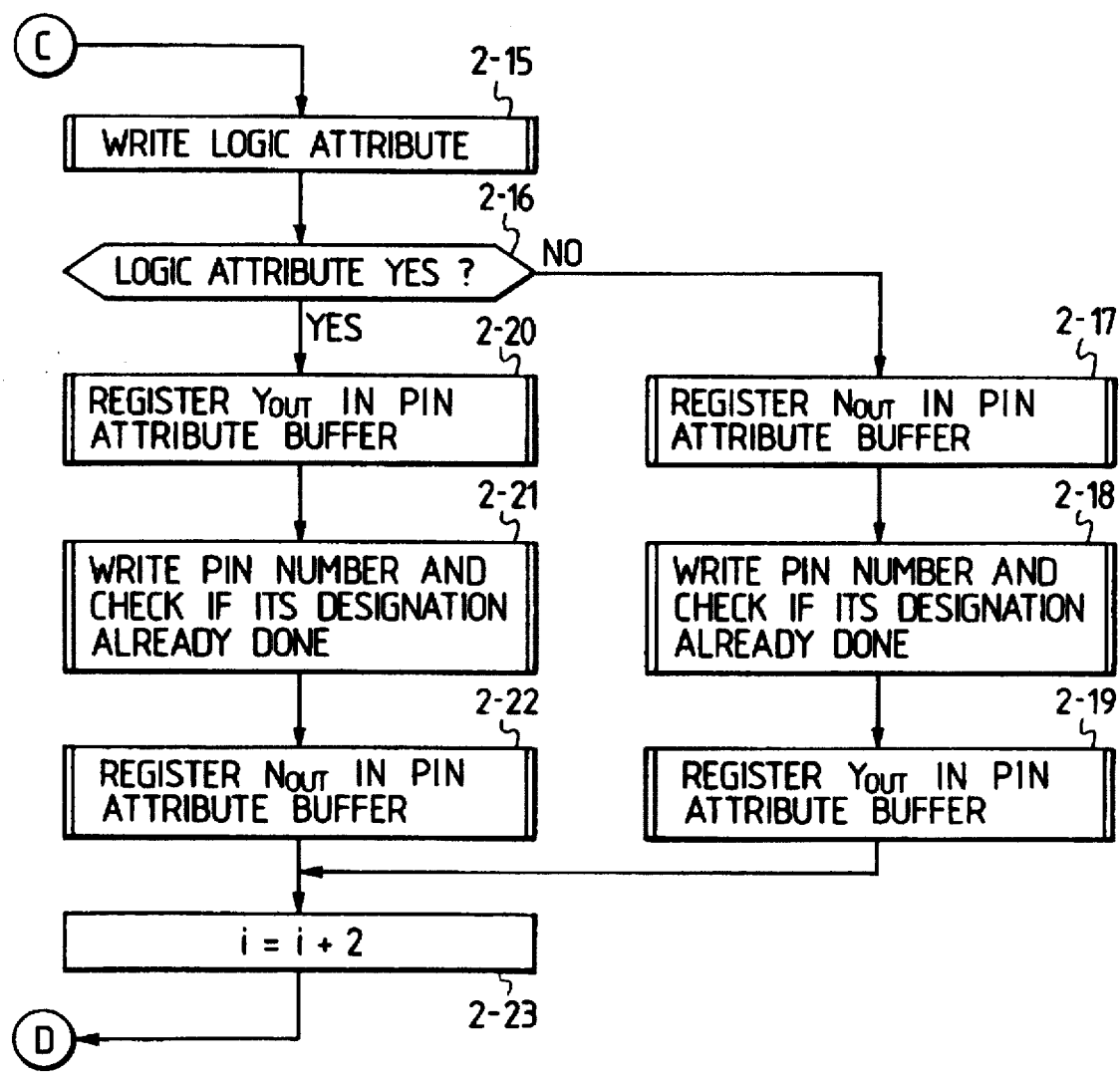
Figures 13, 14:
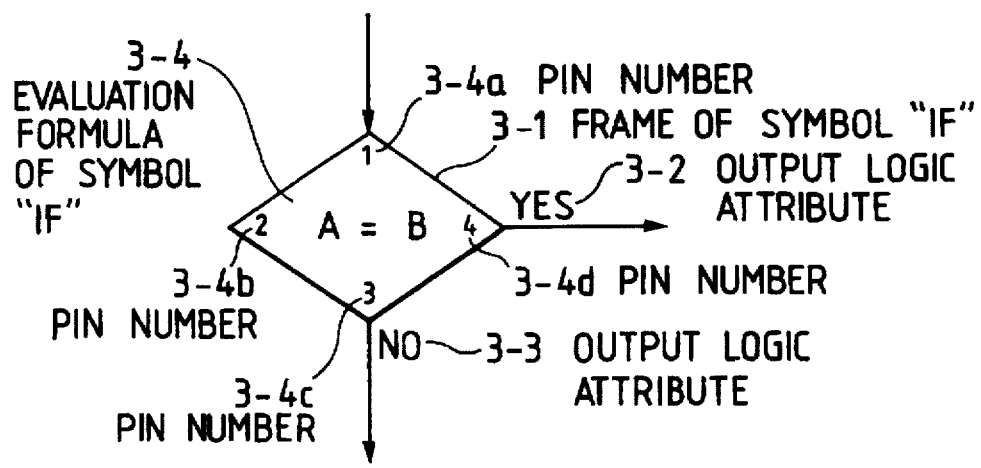
FIG. 13 shows a display pattern of the embodiment shown in FIG. 11.
FIG. 14 shows a format of symbol data of the embodiment shown in FIG. 11.

FIG. 11 is a block diagram showing an arrangement according to still another embodiment of the present invention. In this embodiment, a CAD system for editing a flow chart on a graphic display will be exemplified. The system shown in FIG. 11 includes a keyboard 1-1 as an input device, a mouse 1-2 as another input device, a processing unit (CPU) 1-3 for controlling the entire system, and a memory 1-4. The memory 1-4 consists of an area 1-4$a$ for storing an editor program (FIG. 12) for editing a flow chart, a pin attribute buffer 1-4$b$ for storing attributes of pins of input symbols on a flow chart, i.e., whether a pin is an input or output pin or neither of them, or has a logic attribute of "YES" or "NO" output, buffers 1-4$c$ and 1-4$d$ for temporarily storing input symbol names and position information, respectively, a counter 1-4$e$ indicating the number of already determined pin attributes of input symbols, and an area 1-4$f$ for storing input symbol data. The system also includes a display 1-5 for displaying an editing flow chart, and a display controller 1-6 including a memory 1-6A having storage positions corresponding to pixels on a display frame. FIGS. 12A, 12B and 12C are a flow chart of this embodiment, FIG. 13 shows one frame on the display, and FIG. 14 shows a data format. The operation of the embodiment shown in FIG. 11 will be described below with reference to FIGS. 12A, 12B, 12C, 13, and 14. When an editor for inputting/editing a flow chart is started up, a command from the keyboard 1-1 is waited in step 2-3. If a command "ADDSYM IF" for adding a symbol "IF" for judging a condition is input, the flow advances to step 2-10. In this case, the value i of the counter 1-4$e$ is reset to 0. In step 2-11, the position of the symbol "IF" is determined by the mouse 1-2. The data "IF" is written in the symbol name buffer 1-4$c$, and the position information designated by the mouse is written in the position information buffer 1-4$d$. Only a frame 3-1 (FIG. 13) of the symbol "IF" is written in the memory 1-6A, and is displayed on the dislay. In step 2-12, pin numbers are fetched and checked. If the pin numbers of the symbol "IF" are "1" to "4", as shown in FIG. 13, a pin designation from the mouse is waited, and an entry for a pin designated by the mouse in the pin attribute buffer 1-4$b$ is checked. If an entry is already done, it is waited until another pin is designated by the mouse. If no entry is done, the pin number is held in a register A (1-3$a$). In step 2-13, it is waited until an I/O attribute of the pin is designated at the keyboard 1-1. If the pin is an input pin, a flag IN indicating the input pin is set at a position of the pin number held in the register A of the pin attribute buffer, and the counter value i is incremented by "1". If the pin is an output pin, it is waited in step 2-15 until a logic attribute of the pin (in this case, "YES" or "NO") is designated. If the logic attribute of the pin is "YES", a flag YOUT indicating the output pin having the logic attribute "YES" is set at a position of the pin number held in the register A of the pin attribute buffer, and "YES" is displayed at the pin position as indicated by 3-2 in FIG. 13. The pin number is fetched and checked again. Similarly, a flag NOUT indicating an output pin having a logic attribute "NO" is set at a predetermined position in the pin attribute buffer, and "NO" is displayed at the pin position as indicated by 3-3 in FIG. 13. If the logic attribute designated in step 2-15 is "NO", the same operation as described above is performed while inverting the logic.

The counter value i is added with "2", and if i≠3, the above operation is repeated. If i=3, an evaluation formula 3-4 is input and displayed. Symbol data having a format shown in FIG. 14 is formed on the basis of the symbol name buffer 1-4c, the position information buffer 1-4d, the pin attribute buffer 1-4b, and the evaluation formula input in step 2-27, and is stored at a predetermined position in the symbol data storage area 1-4f.

The processing for the input command of "ADDSYM IF" is completed, and the flow returns to step 2-3. If another command is input, predetermined processing is performed in step 2-5 or 2-6.

As the effect of this embodiment, when one output logic attribute of the symbol "IF" is determined, another output logic attribute is automatically determined even if it is not input, and an error such as an omission or repetitive entries upon determination of logic can be prevented.

A flow chart in this embodiment may be another chart such as an HCP chart, and the symbol is not limited to "IF" but may be any symbol as long as it has logic attributes as output attributes.

The number of output logic attributes is not limited to two, i.e., "YES" and "NO". For example, if a symbol has three or more output logic attributes, after some output attributes are input, the remaining logic attributes may be determined.

As described above, when the logic attribute of an exclusive output of a symbol having output logic attributes is determined, an error such as an omission or repetitive entries of the logic attribute of an exclusive output can be prevented.

Figure 15:
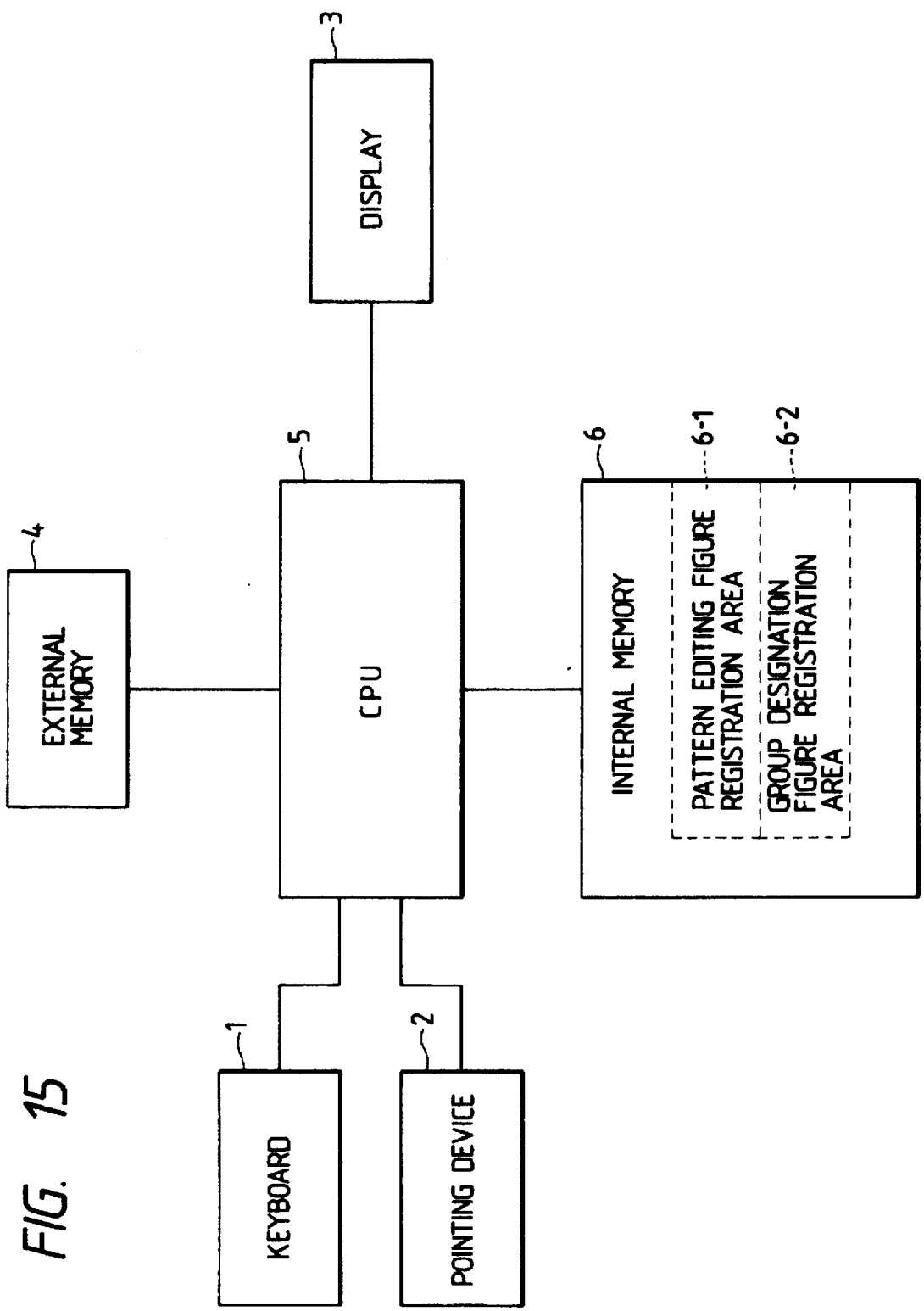
FIG. 15 is a schematic block diagram of a pattern editing apparatus according to still another embodiment of the present invention.

FIG. 15 is a block diagram showing still another embodiment of the present invention. In FIG. 15, a keyboard 1 designates characters, commands, and processing commands, and designates an objective pattern (or figure) and its drawing position. A pointing device 2 moves a cursor, and can designate the processing command, an objective pattern, and its drawing position by switches thereon.

An external memory 4 stores processing procedures shown in FIGS. 16, 19A, 19B and 19C, and stores edited pattern data.

A central processing unit (CPU) 5 loads the processing procedure stored in the external memory 4 to an internal memory 6, and executes it, as will be described later.

The internal memory 6 has a drawing editing pattern (or figure) registration area and a group designation pattern (or figure) registration area in addition to the processing procedure, and stores information, as will be described in detail later with reference to FIG. 18.

Figure 17:
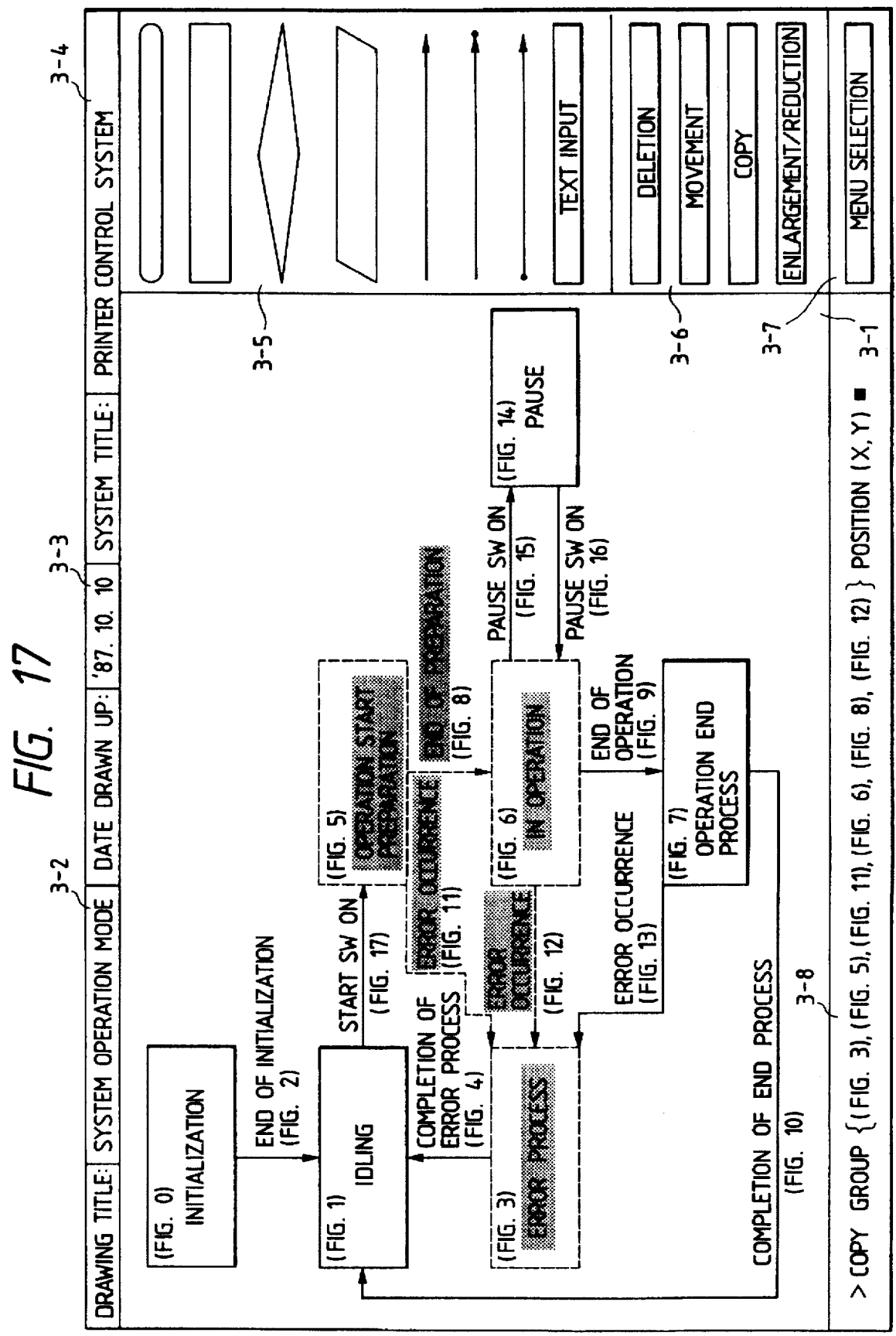
FIG. 17 shows a drawing editing pattern processed by the pattern editing apparatus of the embodiment shown in FIG. 15.

A display 3 displays a drawing, as shown in FIG. 17. The display 3 uses the cursor for designating a position, and the cursor is moved on the screen to realize the purpose.

FIG. 17 shows a display content on the display 3 of the drawing (or pattern) editing apparatus, for example, a software CAD system. An editing drawing display section 3-1 displays an objective drawing edited by the apparatus of this embodiment. Display sections 3-2, 3-3, and 3-4 respectively display a title of a drawing as an editing object, a date of creation/updating of the drawing, and a title of an objective system of the drawing.

A template display section 3-5 displays basic patterns used on an editing drawing. A pattern to be used is selected from this pattern menu using the pointing device, and a position on the editing drawing display section is then designated by the cursor, so that the pattern can be added to the editing drawing. An editing processing command display section 3-6 displays a menu for selecting pattern editing commands such as deletion, movement, copy, and the like with the cursor. A menu selection/change display section 3-7 is used to select or change menus displayed on the display sections 3-5 and 3-6. An input command display section 3-8 displays a processing content of the editing operation.

Prior to a description of the embodiment of the present invention, an editing pattern will be briefly described below. A drawing displayed on the section 3-1 is a state transition chart used in a software creation process. The drawing is constituted by patterns of 'boxes' and 'lines', and logic connection relationships among patterns have functional meanings. For example, (FIG. 3) as a 'box' pattern is logically coupled to four 'line' patterns (FIG. 11), (FIG. 12), (FIG. 13), and (FIG. 4). The respective 'line' patterns are locally connected to 'box' patterns (FIG. 5), (FIG. 6), (FIG. 7), and (FIG. 1). That is, a state "error process" of (FIG. 3) transits from an "operation start preparation" state of (FIG. 5), an "in operation" state of (FIG. 6), and an "operation end process" state of (FIG. 7) upon an action "error occurrence" of (FIG. 11), (FIG. 12), and (FIG. 13). The "error process" state then transits to an "idling" state of (FIG. 1) upon an action of "completion of error process" of (FIG. 4). This embodiment will be described below while six patterns (FIG. 3), (FIG. 5), (FIG. 6), (FIG. 8), (FIG. 11), and (FIG. 12) are group-designated as an objective pattern.

FIG. 18 schematically shows expression states of the patterns in FIG. 17 in the drawing editing pattern registration area.

For example, a 'box' pattern (FIG. 3) is a symbol "BOX", and its position on the drawing is designated by coordinates (x,y) represented by a "starting point". The 'box' pattern (FIG. 3) has character information "error process" starting from the position of the "starting point" (x,y), and is locally connected to input coupled patterns (FIG. 11), (FIG. i2), and (FIG. 13) and to the output coupled pattern (FIG. 4).

The 'line' pattern (FIG. 11) is a "LINE" symbol constituted by three line segments, i.e., a line segment starting from a position of a "starting point" (x,y) to a first transition point (x,y), a line segment from the first transition point to a second transition point (x,y), and a line segment from the second transition point to a terminal point (x,y). The 'line' pattern (FIG. 11) has character information "error occurrence" starting from the "starting point" (x,y), and is locally coupled to an input coupled pattern (FIG. 5) and to the output coupled pattern (FIG. 3).

Each of all the patterns on the drawing has the type of pattern, the position coordinates (position coordinate group), attached information (in this case, character information), and connection relationship information among the patterns.

Figure 16:
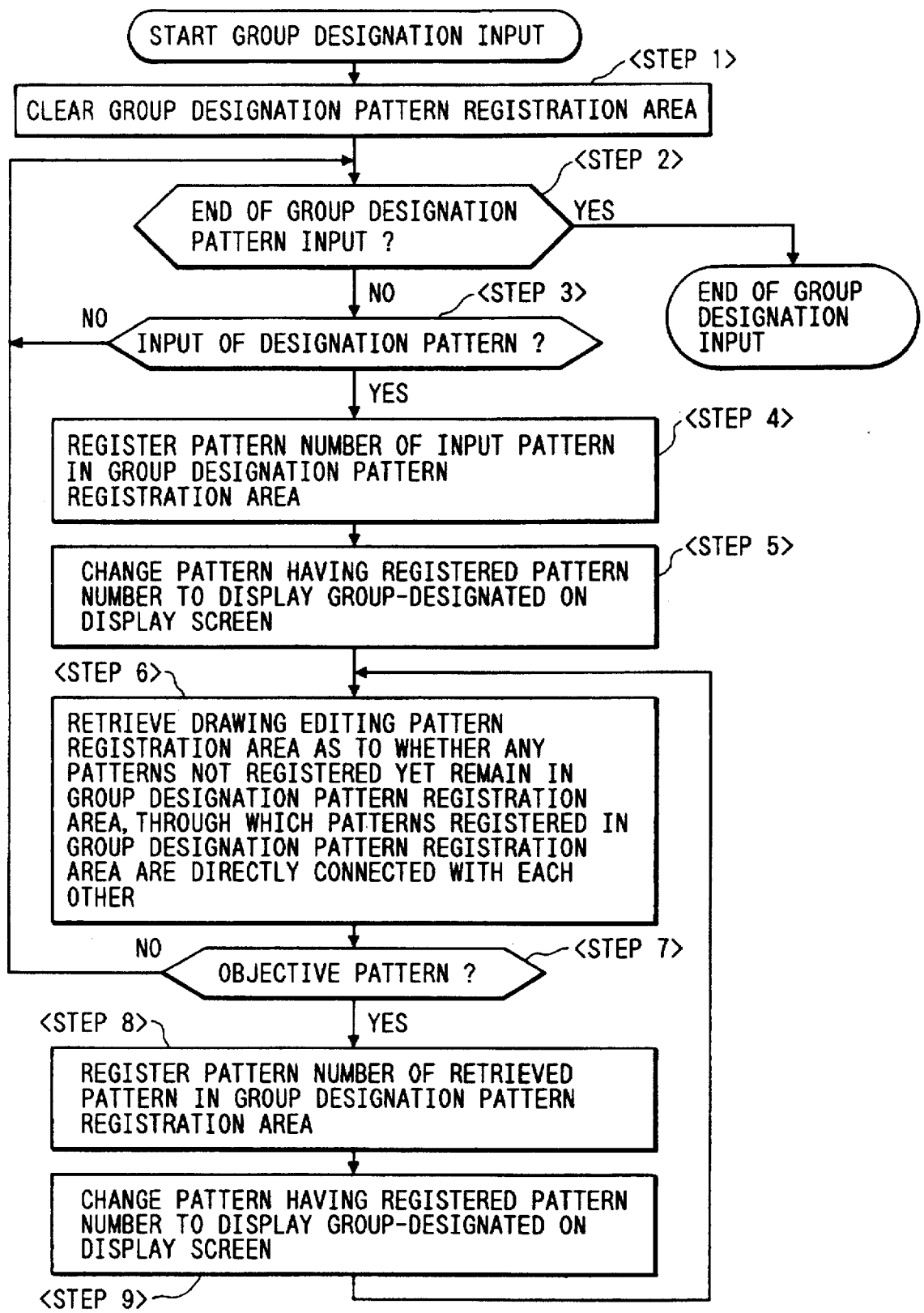
FIG. 16 is a processing flow chart of the embodiment shown in FIG. 15.

The processing procedure of the present invention will be described below with reference to the flow chart of FIG. 16. Group designation of the patterns shown in FIG. 17 will be exemplified below.

When a group designation input is started, the content of the group designation pattern registration area is cleared in step 1, and a new group designation input state is set in step 2.

The control enters a loop of steps 2 and 3 to wait for an instruction indicating an end of a group designation pattern input or a pattern designation input of a designated pattern.

When a pattern (FIG. 3) is input as a designation pattern, the flow advances to step 4. In step 4, the input pattern (FIG. 3) is registered in the group designation pattern registration area, and the display mode of the 'box' pattern (FIG. 3) on the screen is changed to a group-designated display mode (step 5). In this case, the "group-designated display mode" indicates a display state wherein group-designated patterns, e.g., the 'box' on the screen can be easily discriminated by an operator from other patterns by "blinking", "half-tone dot meshing", or changing of a display color.

The flow advances to step 6 to retrieve the drawing editing pattern registration area to judge whether or not patterns which are not group-designated yet and are connected to two or more patterns whose pattern numbers are registered in the group designation pattern registration area remain in the drawing editing pattern registration area. If an objective pattern is retrieved, the flow advances step 8 through step 7. At this time, however, since only the pattern (FIG. 3) is registered in the group designation pattern registration area, the retrieval result indicates no objective pattern, and the flow returns from step 7 to step 2 to wait for the next instruction.

When the pattern (FIG. 5) is input as a designation pattern, the pattern (FIG. 5) is registered in the group designation pattern registration area, and its display mode on the screen is changed to the group-designated display mode (steps 4 and 5).

In the processing in step 6, retrieval is performed for patterns which are connected to the two patterns (FIG. 3) and (FIG. 5). As a result of retrieval, it is detected that only a pattern (FIG. 11) has the patterns (FIG. 3) and (FIG. 5) as the coupled pattern information in the drawing editing pattern registration area for each pattern. Therefore, an objective pattern is detected in step 7, and the flow advances to step 8.

In this case, the pattern (FIG. 11) is registered in the group designation pattern registration area as in the patterns (FIG. 3) and (FIG. 5) which are input as the designation patterns, and its display mode on the screen is changed to the group-designated display mode (steps 8 and 9).

The flow returns to step 6. In this case, the retrieval operation is performed for patterns which are connected to two or more of the three patterns including the pattern (FIG. 11) which is automatically added. Since no objective pattern is detected, the flow returns to the loop of steps 2 and 3 through step 7 to wait for the instruction input.

When a pattern (FIG. 6) is input as a designation pattern, the same processing as for other input patterns is performed for the pattern (FIG. 6) (steps 4 and 5). In step 6, the retrieval operation is performed for patterns which are connected to two or more of the four patterns (FIG. 3), (FIG. 5), (FIG. 11), and (FIG. 6). As a result, two patterns, i.e., (FIG. 8) and (FIG. 12), are detected, and are added to the group-designated patterns as in the pattern (FIG. 11) in steps 8 and 9 through step 7.

In this embodiment, when only three patterns (FIG. 3), (FIG. 5), and (FIG. 6) are designated, the patterns (FIG. 8), (FIG. 11), and (FIG. 12) are automatically additionally designated, so that the desired patterns (FIG. 3), (FIG. 5), (FIG. 6), (FIG. 8), (FIG. 11), and (FIG. 12) can be group-designated.

Figure 19B:
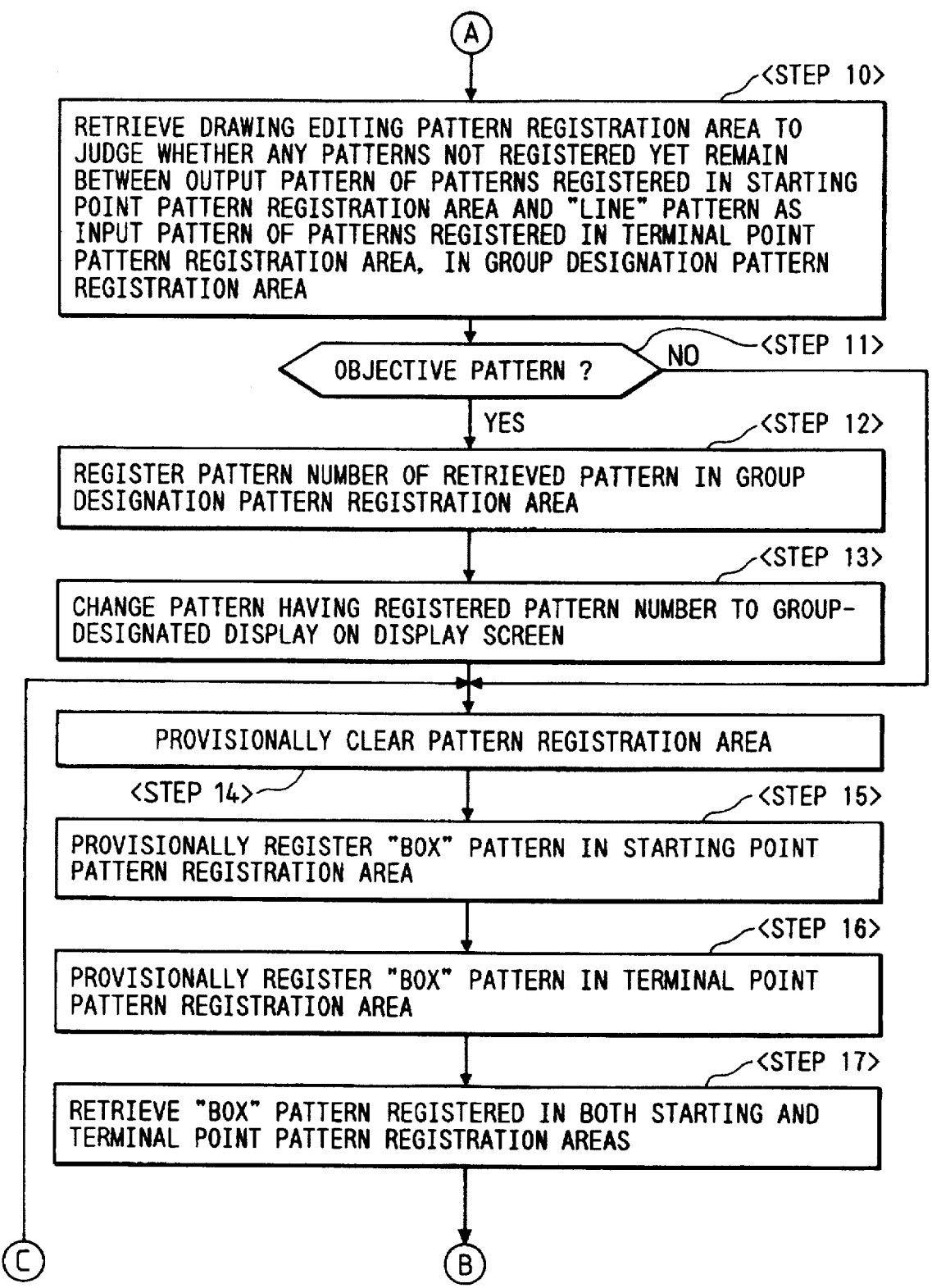
Figure 19C:
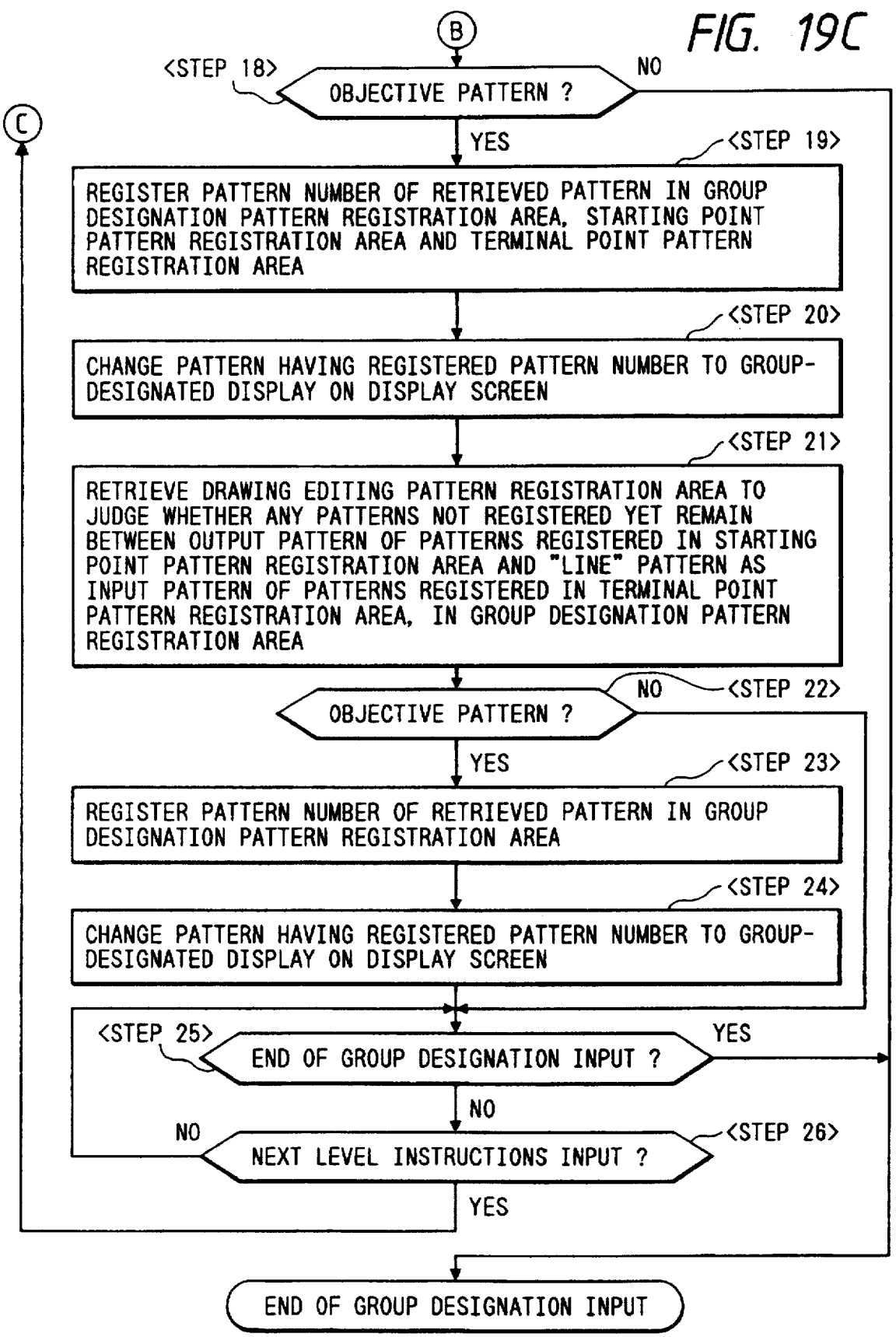

In the above description, a case has been exemplified wherein the 'box' is input as a designation pattern. However, the 'line' may be designated as a designation pattern, and both the 'box' and 'line' may be designated. For example, patterns (FIG. 8), (FIG. 11), and (FIG. 12) as 'line' patterns are input as designation patterns, six patterns (FIG. 3), (FIG. 5), (FIG. 6), (FIG. 8), (FIG. 11), and (FIG. 12) are group-designated as in the above description. FIGS. 19A, 19B and 19C show a flow chart of processing in still another embodiment.

In this embodiment, easier group designation is allowed by referring to an input/output direction of a pattern in the above embodiment. According to this embodiment, a 'box' pattern serving as a starting point and a 'box' pattern serving as a terminal point are designated, so that patterns as a path starting from the starting point pattern to the terminal point pattern can be group-designated along a control flow or a signal flow.

In order to realize group designation of patterns shown in FIG. 17, a pattern (FIG. 5) is designated as a starting point pattern, and a pattern (FIG. 3) is designated as a terminal point pattern.

This embodiment will be briefly described below with reference to the flow chart in FIGS. 19A, 19B and 19C. In this case, the above-mentioned group designation will be exemplified.

When a group designation input is started, the contents of the group designation pattern registration area, a starting point pattern registration area, and a terminal point pattern registration area in a working area are cleared, and a new group designation input state (step 1) is set.

The control enters a loop of steps 2 and 3 to wait for an instruction indicating an end of a starting point pattern input of a group designation pattern input or an instruction input of a "BOX" pattern serving as a starting point pattern.

When a pattern (FIG. 5) is input as the starting point pattern, the flow advances to step 4, and the input pattern (FIG. 5) is registered in the group designation pattern registration area and the starting point pattern registration area. In addition, the display mode of the 'box' pattern (FIG. 5) on the screen is changed to a group starting point designated display mode (step 5). In this case, the "group starting point designated display mode" indicates a display state wherein group-designated starting point patterns, e.g., the 'box' on the screen can be easily discriminated by an operator from other patterns by "blinking", "half-tone dot meshing", or changing of a display color.

The flow returns to the loop of steps 2 and 3 to wait for an instruction input of another starting point pattern. When no starting point pattern is designated, the control advances to processing for waiting for a terminal point pattern instruction input upon instruction of the end of the starting point pattern input (steps 6 and 7).

When a "BOX" pattern (FIG. 3) is input as a terminal point pattern, the flow advances to step 8. The input pattern (FIG. 3) is registered in the group designation pattern registration area and the terminal point pattern registration area. In addition, the display mode of the 'box' pattern (FIG. 3) on the screen is changed to a group terminal point designated display mode (step 9). In this case, the "group terminal point designated display mode" also indicates a display state wherein group-designated terminal point patterns, e.g., the 'box' on the screen can be easily discriminated by an operator from other patterns by "blinking", "half-tone dot meshing", or changing of a display color. The flow returns to a loop of steps 6 and 7 to wait for an instruction input of a terminal point pattern.

When an instruction indicating an end of an input of the terminal point pattern is input, the flow advances to step 10 to retrieve the drawing editing pattern registration area to judge whether or not 'LINE patterns which are not group-designated and serve as output coupled patterns of those registered in the starting point pattern registration area and as input coupled patterns of those registered in the terminal point pattern registration area remain in the drawing editing pattern registration area. If there is no objective pattern, the flow advances to step 14 through step 11; otherwise, the flow advances to step 12.

In this case, a pattern (FIG. 11) is an output coupled pattern of the pattern (FIG. 5), and as an input coupled pattern of the pattern (FIG. 3), and is registered in the group designation pattern registration area as the group-designated pattern in steps 12 and 13. In addition, its display mode is changed to the group-designated display mode.

The flow then advances to step 14. In steps 14 to 18, "BOX" patterns as a path starting from the starting point pattern to the terminal point pattern are retrieved according to a flow. In step 14, provisional starting and terminal point registration areas as working areas therefor are cleared. In step 15, a "BOX" pattern which is connected to as an input "LINE" pattern an output "LINE" patterns of the pattern registered as the starting point pattern is registered in the provisional starting point pattern registration area. In step 16, "BOX" patterns which are connected to as output "LINE" patterns input "LINE" patterns of the pattern registered as the terminal point pattern are registered in the provisional terminal point pattern registration area. In steps 17 and 18, the patterns registered in both the provisional starting and terminal point pattern registration areas are obtained to detect "BOX" images connecting the starting and terminal point patterns.

In this state, in step 15, a pattern (FIG. 6) is registered in the provisional starting point registration area. In step 16, patterns (FIG. 6) and (FIG. 7) are registered in the provisional terminal point registration area. As a result, the pattern (FIG. 6) is detected as an objective pattern in steps 17 and 18, and the flow advances to processing in step 19.

The pattern (FIG. 6) is added to the group-designated patterns in steps 19 and 20, and is registered in the starting and terminal point pattern registration areas in steps 19 and 20. In steps 21 to 24, patterns (FIG. 8) and (FIG. 12) as "LINE" patterns connecting the starting and terminal patterns are added as the group-designated patterns.

Thereafter, the control enters a loop of steps 25 and 26 to wait for an instruction indicating an end of a group designation input or a retrieval instruction of NEXT level. When the group designation input is ended at this time, group designation of patterns can be performed by designating only the starting point pattern (FIG. 5) and the terminal point pattern (FIG. 3).

In this embodiment, when the NEXT level instruction is input, the range of group designation can be widened within the range of the input starting and terminal point patterns. For example, if the NEXT level instruction is input in the instruction input waiting state in steps 25 and 26, the flow returns to step 14, and evaluation is performed for the patterns (FIG. 5) and (FIG. 6) as the starting point patterns and for (FIG. 3) and (FIG. 6) as the terminal point patterns. Thus, patterns (FIG. 7), (FIG. 14), (FIG. 9), (FIG. 13), (FIG. 15), and (FIG. 16) are added as the group-designated patterns.

As described above, associated patterns are grouped on the basis of the connection relationship between the designated patterns, so that only functionally associated patterns can be selectively group-designated regardless of positions of the patterns on the drawing, and the designation pattern input operation can be simplified, thus improving operability.

Figure 20:
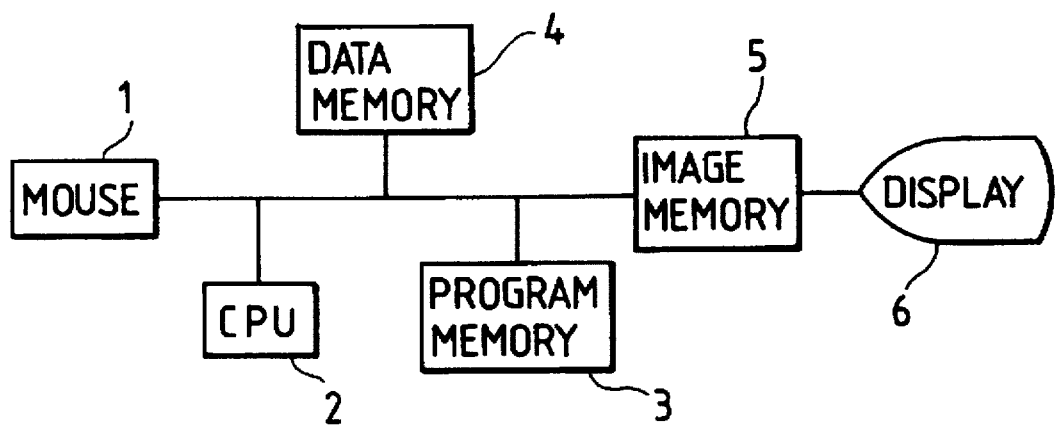
FIG. 20 is a block diagram showing still another embodiment of the present invention.

FIG. 20 is a block diagram showing still another embodiment of the present invention.

Figure 24:
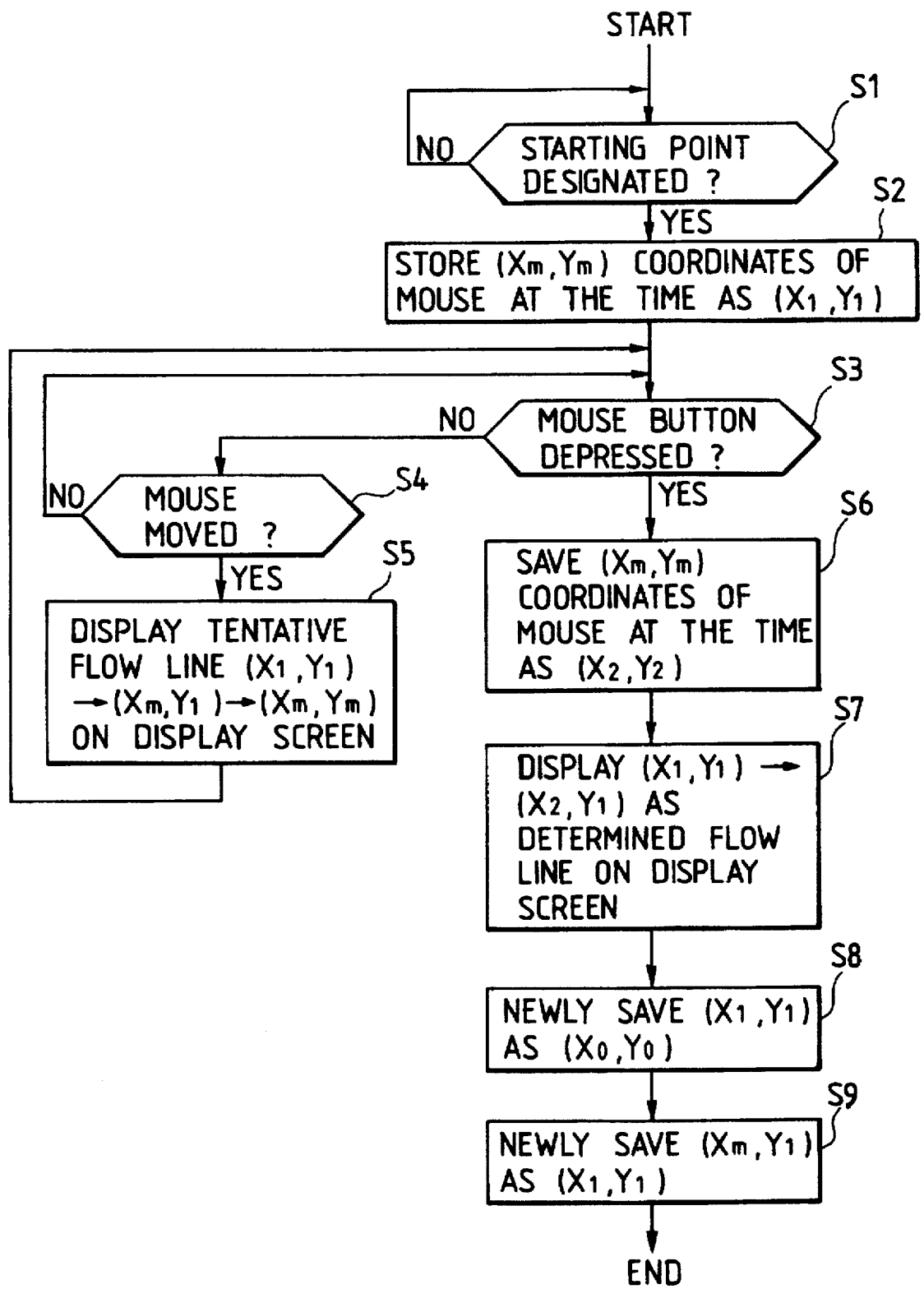
FIG. 24 is a processing flow chart when a line is drawn from the starting point.
Figure 27:
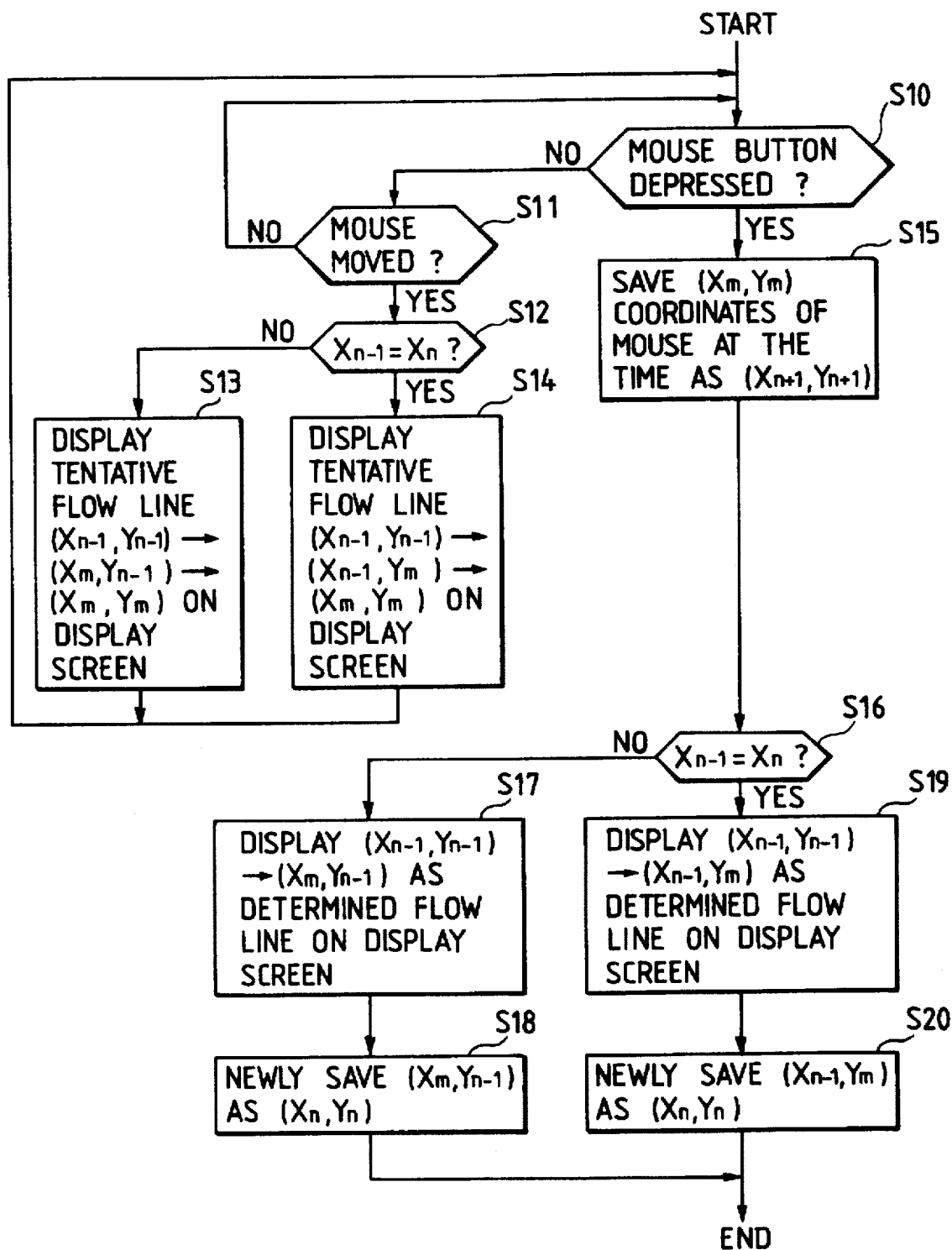
FIG. 27 is a processing flow chart after the (n+1)th point is designated.

This embodiment comprises a mouse 1 having buttons for inputting position coordinates indicated by a cursor and for giving an instruction, a CPU 2 for performing processing in accordance with a processing procedure, a program memory 3 for storing a control procedure shown in FIGS. 24 and 27, a coordinate data memory 4, an image memory 5, and a display 6.

The coordinate data memory 4 will be described in detail below.

Figure 21:
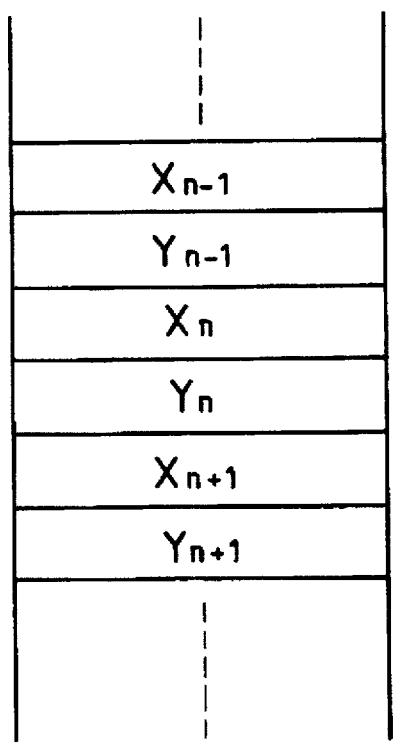
FIG. 21 shows a data memory.

FIG. 21 shows coordinate data in the coordinate data memory 4. Coordinates of an nth point designated by the mouse 1 are processed by the CPU 2, and are stored in the coordinate data memory 4 as a set of an X-coordinate $X_n$ and a Y-coordinate $Y_n$.

The operation of this embodiment with the above arrangement will be described below with reference to FIG. 24.

Figure 22:
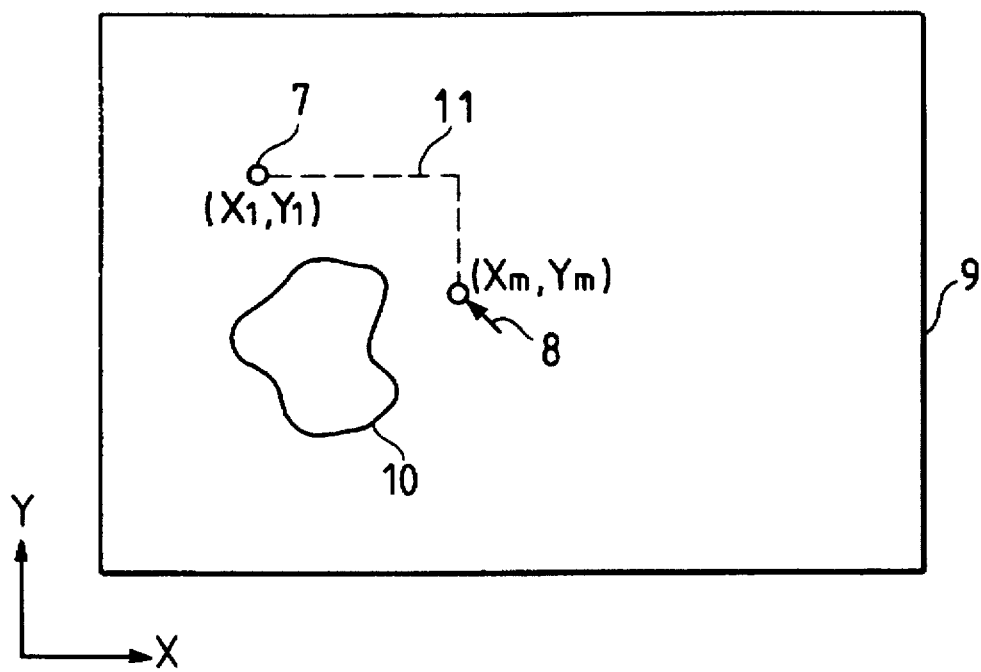
FIG. 22 shows a frame when a line is started to draw from a starting point.
Figure 23:
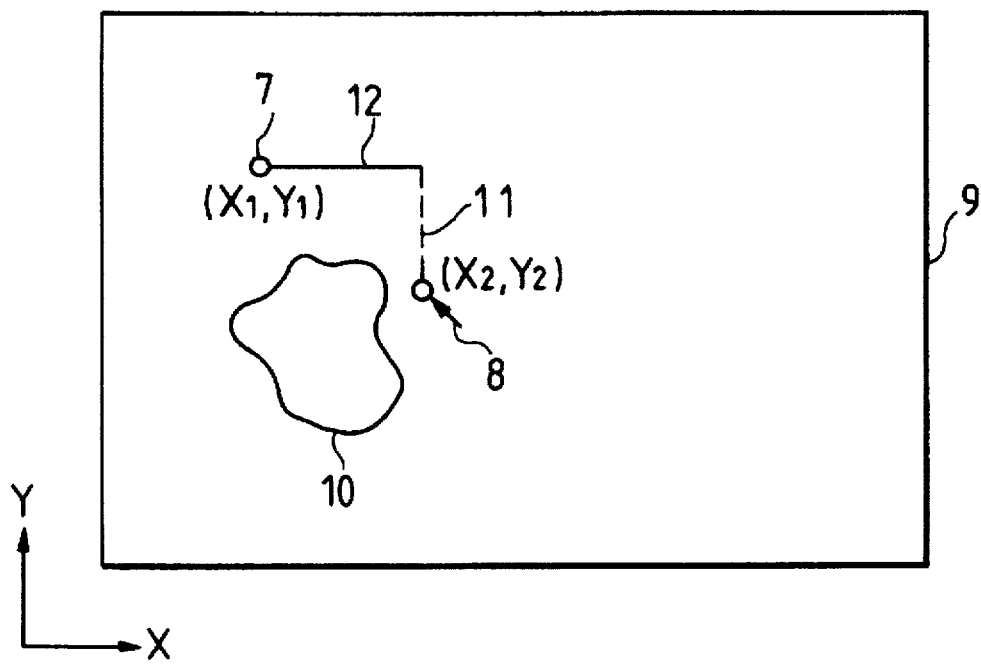
FIG. 23 shows a frame when a line drawn from the starting point is determined.

In step S1, an operator determines a starting point 7 using the mouse 1. For the starting point, since no previously designated point is present, a flow line always extends in a horizontal direction (X-axis direction). FIG. 22 shows a state wherein the mouse 1 is moved and reaches coordinates $(X_m, Y_m)$. In FIG. 22, 8 designates a mouse cursor; 9, a display frame of the display; 10, an already drawn pattern. In this case, the CPU 2 determines a tentative flow line 11 as follows. That is, if the flow line is extended in the x-axis direction, and the X-coordinate becomes equal to $X_m$ in step S5, the flow line is then extended in the Y-axis direction, until the Y-coordinate becomes equal to $Y_m$. The data of the tentative flow line 11 determined in this manner is sent to the image memory 5, and is displayed as a dotted line on the display 6. If the mouse is further moved, a tentative flow line is determined again in accordance with the moved position, and is immediately displayed on the display 6. The operator checks the displayed tentative flow line to judge whether or not the displayed line is satisfactory. If the line is satisfactory, he or she depresses the button of the mouse 1 to inform determination to the CPU 2. Thus, YES is obtained in step S3, and the CPU 2 saves the coordinates $(X_m, Y_m)$ of the point as $(X_2, X_2)$ in the data memory 4 in step S6. Furthermore, the CPU 2 determines a portion of the tentative flow line $(X_1, Y_1) \rightarrow (X_2, Y_1)$ as a determined flow line 12. In step S7, the CPU 2 sends the data to the image memory 5, so that the determined flow line is displayed on the display 6 as a solid line. In step S8, the CPU 2 transfers the data $(X_1, Y_1)$ to a position $(X_0, Y_0)$ in the data memory, and newly saves the coordinates of the starting point of the determined flow line 12 as $(X_1, Y_1)$ in step S9.

Figure 25:
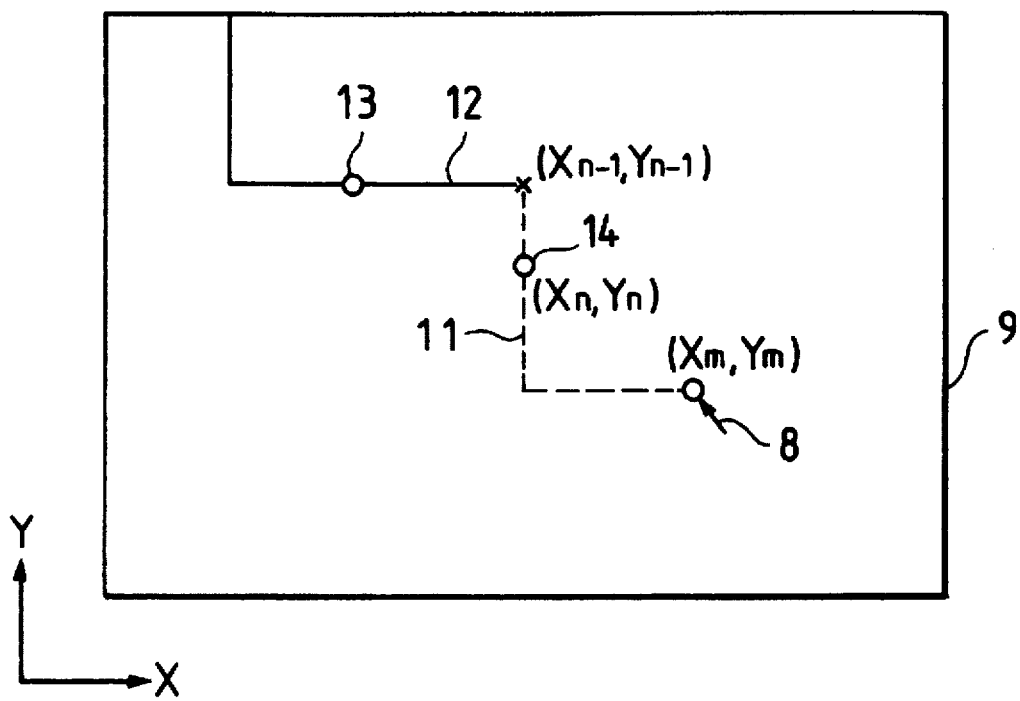
FIG. 25 shows a frame before an (n+1)th point is designated.
Figure 26:
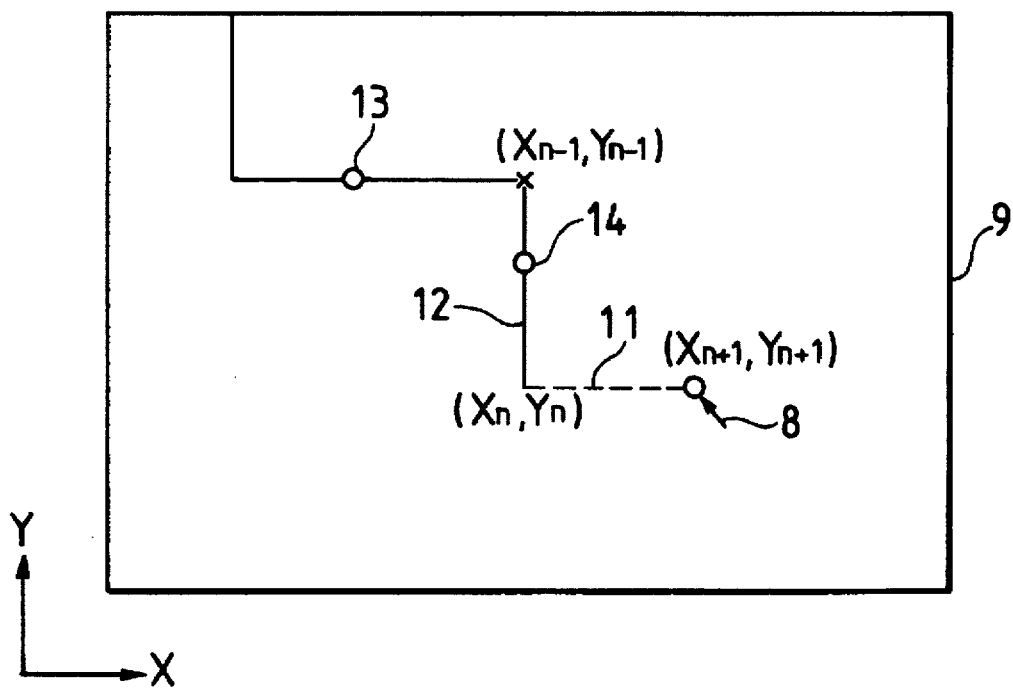
FIG. 26 shows a frame after the (n+1)th point is designated.

In this manner, the first flow line can be drawn from the starting point 7. Thereafter, the method of determining a tentative flow line is slightly different. A case will be described below wherein after an nth point is designated, an (n+1)th point is to be designated. A state in this case is as shown in FIG. 25. In FIG. 25, 13 designates an (n–1)th designated point, and 14 designates an nth designated point. A method of determining a tentative flow line 11 is as shown in FIG. 27. The method will be described below with reference to FIGS. 26 and 27.

When the determined flow line is determined, coordinates $(X_{n-1}, Y_{n-1})$ do not correspond to the point 13 designated by the mouse but correspond to the starting end of the determined line. If $X_{n-1}$ and $X_n$ are compared in step S12, the flow branches to the following two cases:

(1) If $X_{n-1}=X_n$, $(X_{n-1}, Y_{n-1}) \rightarrow (X_{n-1}, Y_m) \rightarrow (X_m, Y_m)$ serves as a tentative flow line in step S14.

(2) If $X_{n-1} \neq X_n$, $(X_{n-1}, Y_{n-1}) \rightarrow (X_m, Y_{n-1}) \rightarrow (X_m, Y_m)$ serves as a tentative flow line in step S13.

FIG. 25 shows the case (1).

The determined tentative flow line 11 is transferred to the image memory and is immediately displayed on the display 6 to wait for judgment of the operator. If the operator depresses the button of the mouse to inform determination to the CPU 2, the flow advances from step S10 to step S15. In step S15, coordinates $(X_m, Y_m)$ indicated by the mouse at that time are saved in the data memory 4 as $(X_{n+1}, Y_{n+1})$. In the case (1), i.e., if YES in step S16, a portion $(X_{n-1}, Y_{n-1}) \rightarrow (X_{n-1}, Y_m)$ of the tentative flow line is determined as the determined flow line 12. In the case (2), i.e., if NO in step S16, a portion $(X_{n-1}, Y_{n-1}) \rightarrow (X_m, Y_{n-1})$ is determined as the determined flow line. The data is sent to the image memory 5 and is displayed on the display 6 as a solid line. Coordinates $(X_{n-1}, Y_m)$ of the starting end of the determined flow line 12 are newly saved as $(X_n, Y_n)$.

The present invention is not limited to the above embodiment. For example, when a tentative flow line is changed, line connection can be performed by an operation according to an application.

According to the present invention, polygonal lines can be drawn with high operability as compared to a conventional system.

Figure 28:
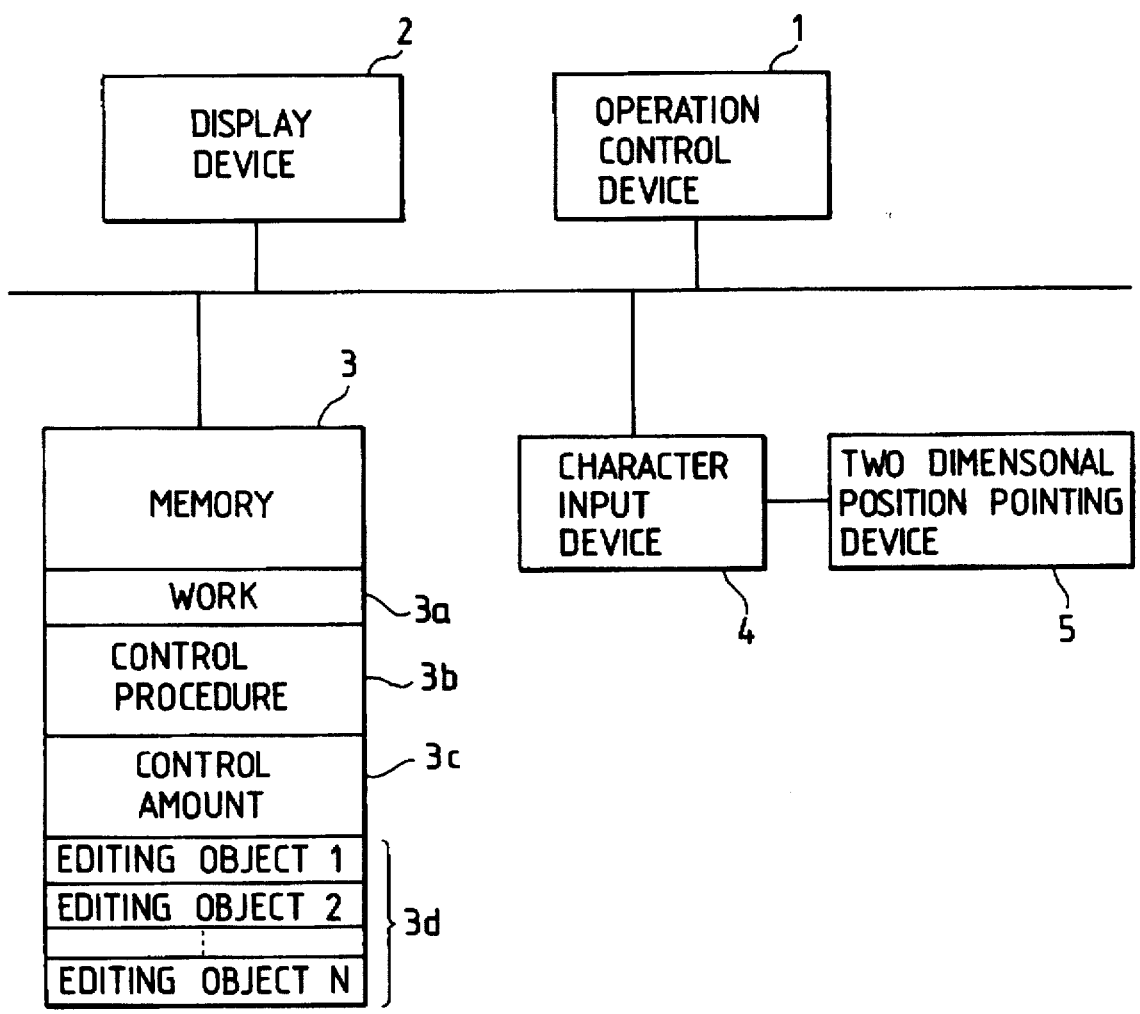
FIG. 28 is a block diagram showing still another embodiment of the present invention.
Figures 30, 31:
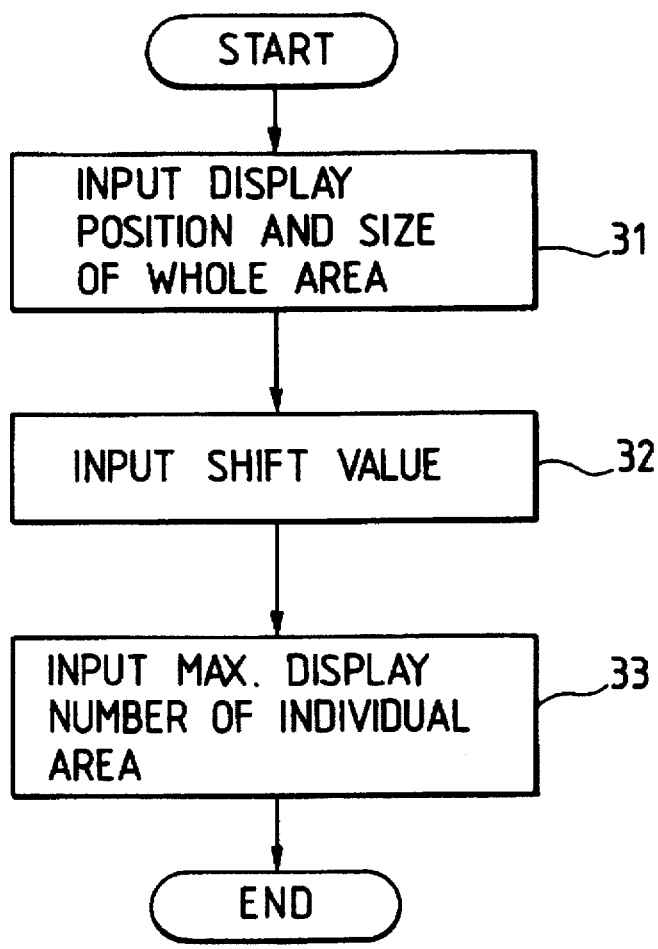
FIG. 30 is a flow chart showing processing means for inputting data necessary for an assignment calculation of individual areas.
FIG. 31 shows contents of a memory which are stored in the order of FIG. 30.
Figure 32:
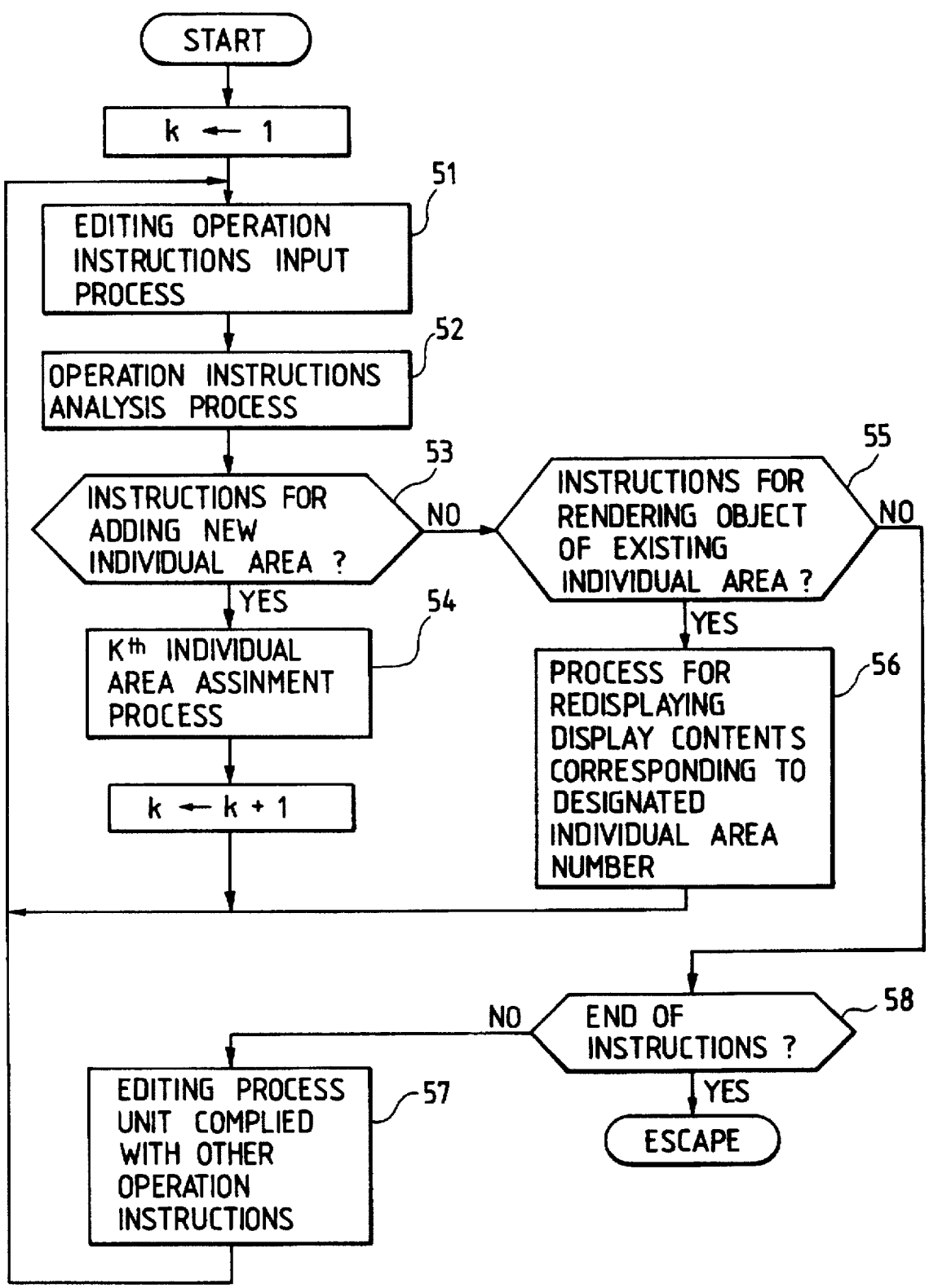
FIG. 32 is a flow chart showing a procedure for executing processing in accordance with the data contents shown in FIG. 31 and an editing operation designated by a character input device such as a keyboard and a two-dimensional position pointing device such as a mouse.
Figure 33:
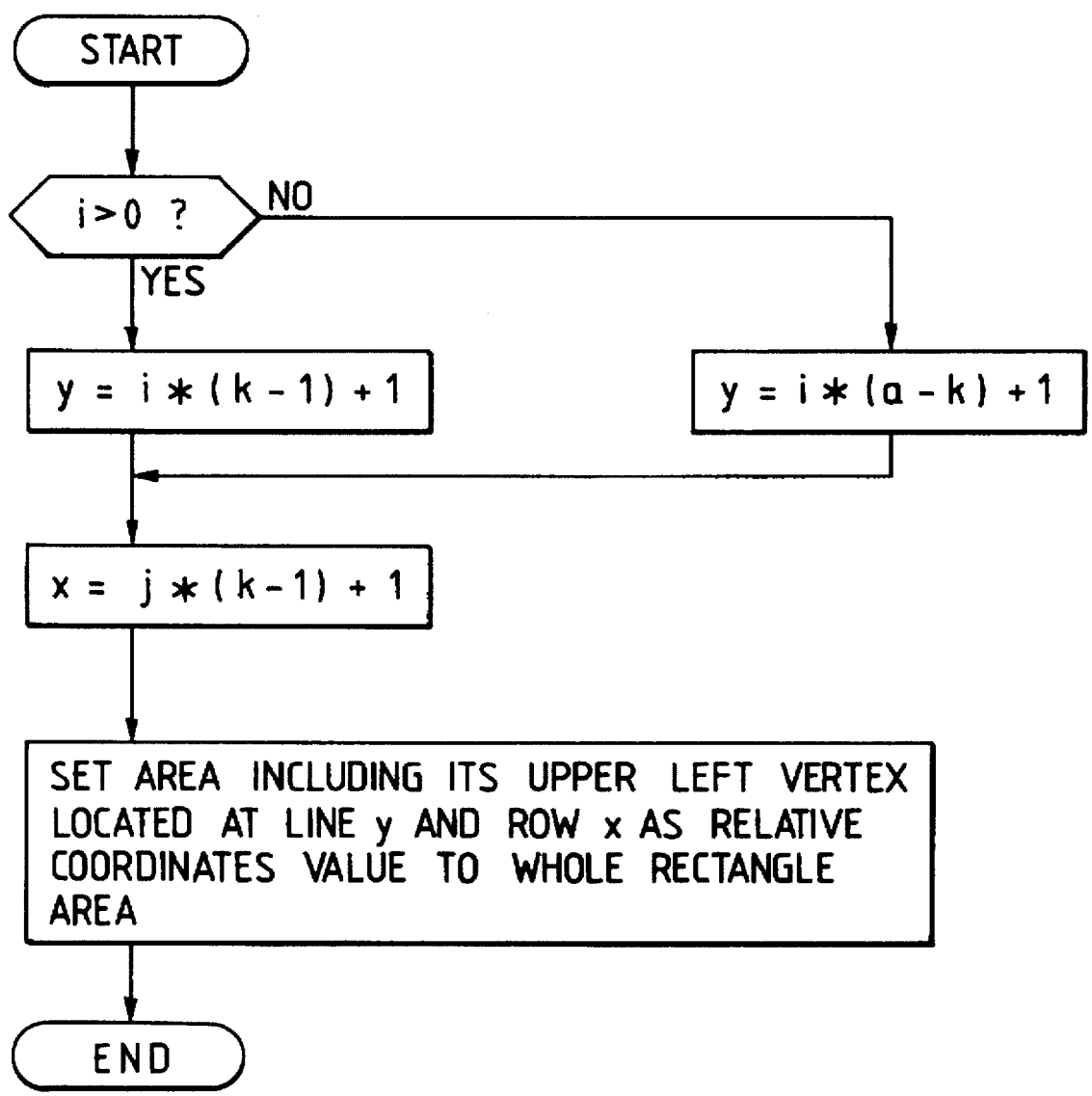
FIG. 33 is a flow chart showing a detailed procedure of the processing content shown in FIG. 32.

FIG. 28 is a block diagram of a pattern editing apparatus according to still another embodiment of the present invention. In FIG. 28, the apparatus includes an operation control device 1, a display device 2, and a memory 3 which can be accessed by the operation control device 1, stores a control procedure 3b shown in FIGS. 30, 32, and 33, and has a control amount area 3c shown in FIG. 31, a plurality of editing object areas 3d, and a work area 3a. FIG. 31 shows the content of the control amount area 3c in detail.

Figure 29:
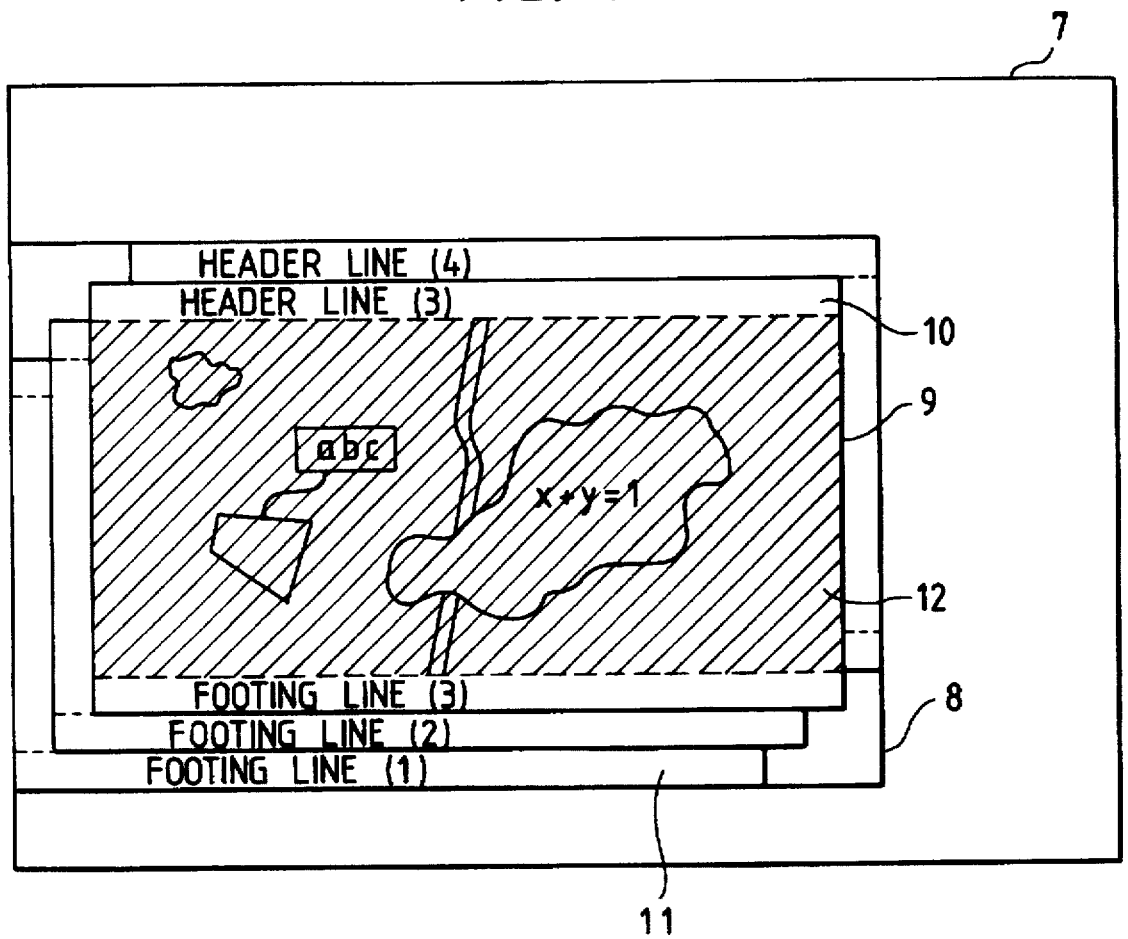
FIG. 29 shows a display pattern on a display device.

The apparatus also includes a character input device 4, and a two-dimensional position pointing device 5. Input signals at the devices 4 and 5 are stored in the memory through the operation control device 1. FIG. 29 shows a display frame on the display device when pattern editing is performed using the apparatus of this embodiment. On this frame, an area 7 can display the entire frame. An area 8 is included in the area 7, and entirely displays a plurality of individual areas. An individual area 9 is included in the area 8. Each of header and footing line display areas 10 and 11 is included in the corresponding area 9, and displays information such as an editing object drawing number and the like which can identify the corresponding individual area from other individual areas. An area 12 is included in the corresponding area 9, and displays a character or a pattern such as a line segment serving as an actual editing object. Prior to a pattern editing operation, information shown in FIG. 31 is input and stored in the memory 3 shown in FIG. 28 in accordance with the procedure shown in FIG. 30. In step 31 in FIG. 30, an input request of a display position and size of the whole area is displayed on the display device 2 shown in FIG. 28, and values are input at the keyboard 4 in FIG. 28. Similarly, in steps 32 and 33 in FIG. 30, a shift value and a maximum display number of individual areas are input. Thus, the content shown in FIG. 31 is held in the memory 3 in FIG. 28. When the pattern editing operation is started, the area 8 in FIG. 29 is displayed on the basis of the position and size of the whole area in FIG. 31, and editing processing is performed in accordance with the procedure shown in FIG. 32.

The operation of this embodiment with the above arrangement will be described below. The control amount is input from the character input device 4, as shown in FIG. 30. In step 51 in FIG. 32, the operator inputs an operation instruction at the keyboard 4 or the two-dimensional position pointing device 5 shown in FIG. 28. In step 52 in FIG. 32, the content of the operation instruction is analyzed. In step 53 in FIG. 32, it is checked if the analysis result of the operation instruction analysis processing in step 52 in FIG. 32 indicates an instruction for assigning a new individual area. If YES in step 53, an area assignment calculation according to an individual area number is performed in step 54 in FIG. 32, i.e., in accordance with a procedure shown in FIG. 33. The new area 9 shown in FIG. 9 is displayed, and the flow returns to step 51 in FIG. 32 to wait for an operation instruction. If NO in step 53 in FIG. 32, it is checked in step 55 in FIG. 32 if the analysis result indicates a selection instruction of an already assigned individual area. If YES in step 55, the corresponding individual area is selected in step 56 in FIG. 32, and is redisplayed to set it as an editing objective area. The flow then returns to step 51 in FIG. 32. If NO in step 55 in FIG. 32, pattern addition/deletion processing is performed in accordance with the analysis result in step 52 in FIG. 32, and the flow returns to step 51 in FIG. 32. If the analysis result indicates an end instruction, the flow escapes the repetitive processing from step 58 in FIG. 32. In this embodiment, as shown in the display frame of FIG. 29, the maximum display number of the individual areas is set to be 4, the shift value in the horizontal direction is set to be 1, and the shift value in the vertical direction is set to be −1. Therefore, every time the individual area is assigned, it is shifted in an upper right direction. If the shift value in the vertical direction is set to be a positive value, the individual area can be shifted in a lower right direction.

According to the present invention, a pattern editing apparatus capable of displaying areas corresponding to a plurality of editing objects to partially overlap each other, comprises:

a storage means for storing the number of the plurality of editing objects;

a shift value storage means for storing shift values for respectively shifting the plurality of editing objects;

an input means for inputting a new editing object; and a means for updating a display position of the new editing object from the input means and the shift value of the shift value storage means on the basis of the shift value of the shift value storage means and the number of objects stored in the storage means.

Thus, levels of objects having a hierarchical structure can be recognized on a screen in accordance with an assignment order. An operation for selecting each individual area or an operation for assigning a new individual area can be performed by a single operation, e.g., depression of the button of the mouse, and an operation associated with a plurality of objective areas can be facilitated.

Figure 34:
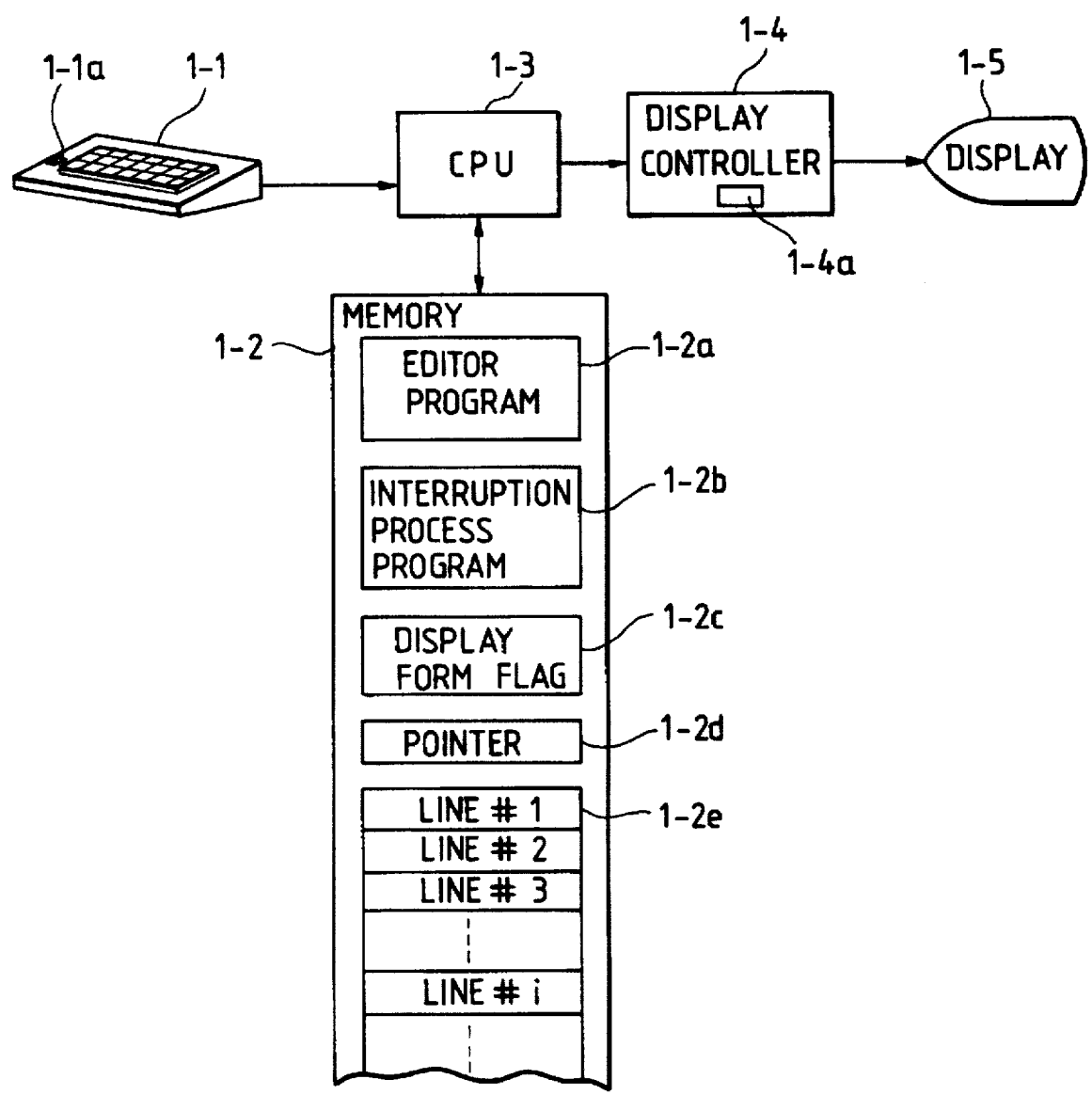
FIG. 34 is a block diagram showing still another embodiment of the present invention.

FIG. 34 is a block diagram of an embodiment of a display apparatus according to the present invention. In the display apparatus of this embodiment, while a specific key α on a keyboard is depressed, for example, a display form is switched from a regular magnification display mode to a smaller scale display mode.

In FIG. 34, a keyboard 1-1 has keys for inputting characters, symbols, and function information. A switch or key α 1-1a on the keyboard 1-1 is used for switching the display mode, and corresponds to the key α. A memory 1-2 has an area 1-2a for storing an editor program shown in FIGS. 35A and 35B for editing characters and patterns, an area 1-2b for storing a program for processing interruption occurring when the key α 1-1a is depressed or released, a display form flag 1-2c indicating that the display form is the regular magnification display mode or the smaller scale (reduction or minification) display mode, an area 1-2e for storing pattern drawing data created by the editor program during pattern editing, and a pointer 1-2d for designating specific drawing data on the area 1-2e. A display controller 1-4 displays drawing data on the area 1-2e on a display 1-5 in accordance with the display form flag 1-2c, and has a memory 1-4a corresponding to the screen of the display 1-5. A CPU 1-3 executes the programs stored in the areas 1-2a and 1-2b.

Figure 35A:
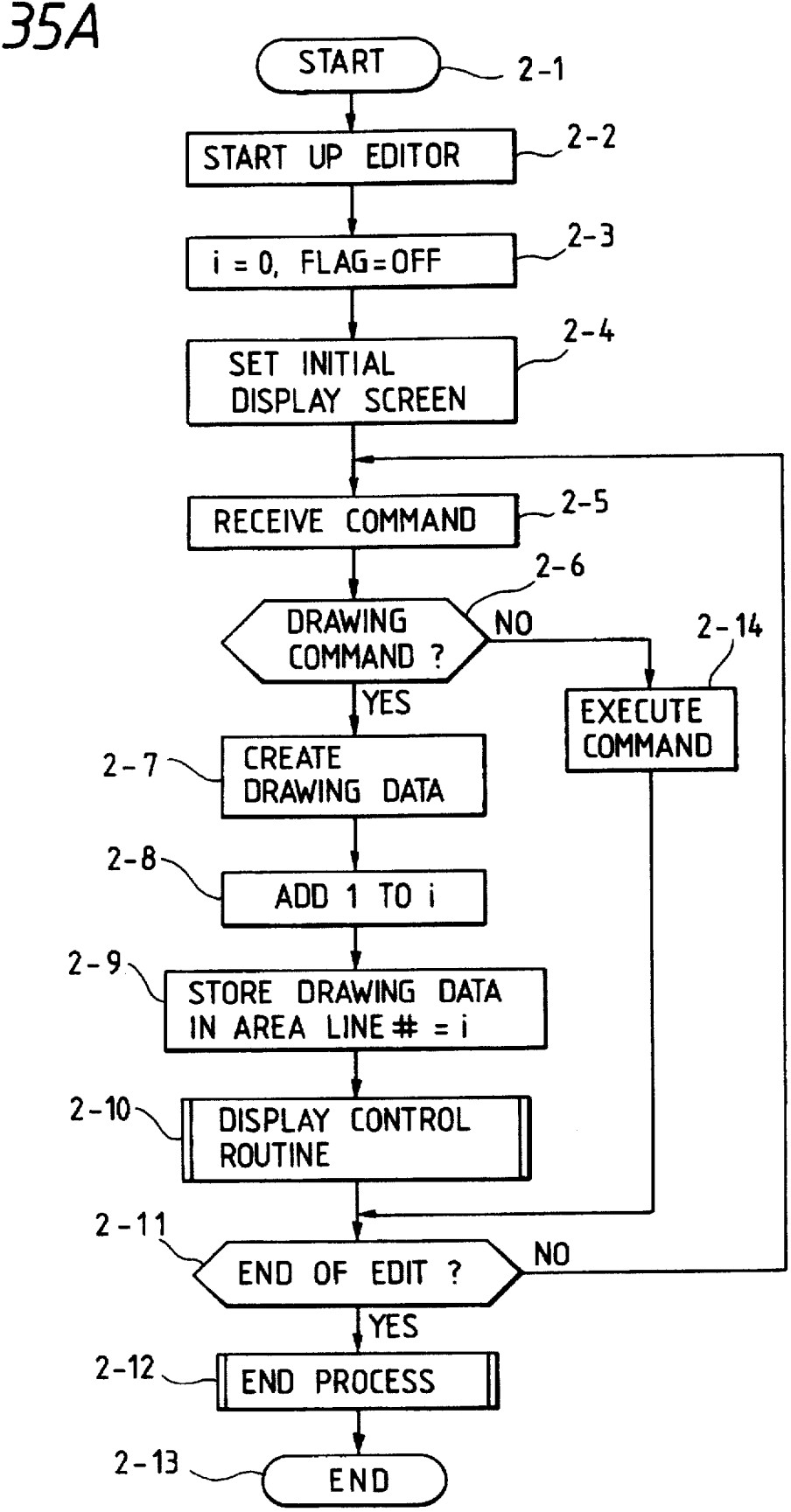
FIGS. 35A, 35B, and 35C are flow charts associated with the embodiment shown in FIG. 34.
Figure 35B:
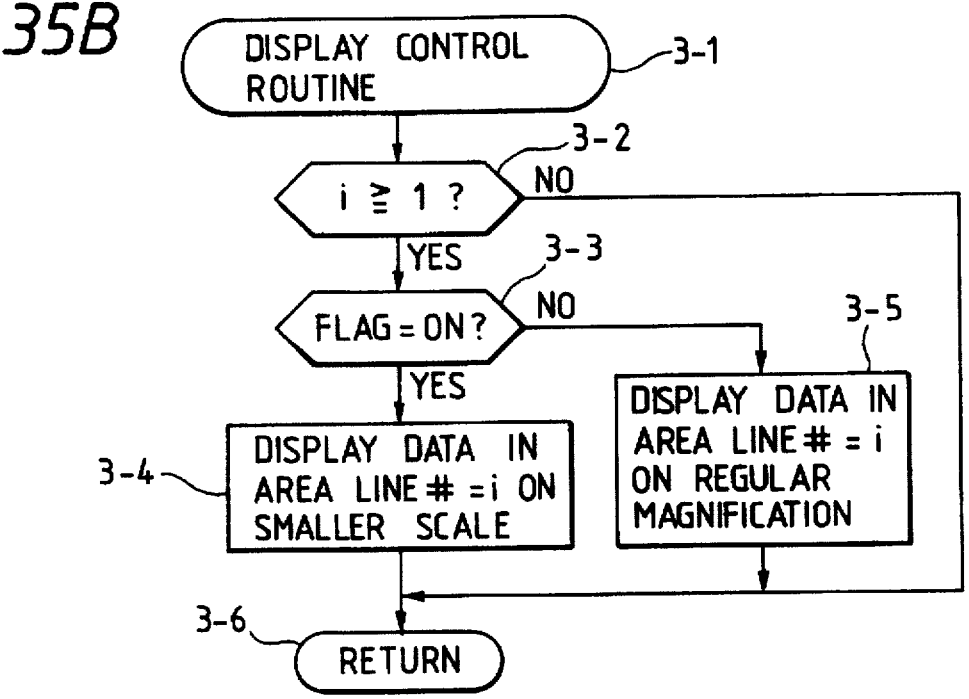

The operation of the apparatus shown in FIG. 34 will be described below with reference to the flow charts shown in FIGS. 35A, 35B, and 35C. In step 2-2, a pattern editor is started up. In step 2-3, a pointer (represented by i on the flow charts) i indicating a data storage position on the pattern drawing data storage area 1-2e is reset to 0, and the flag indicating the display form (represented by "flag" on the flow charts; if it is ON, it indicates the smaller scale display mode, and if it is OFF, it indicates the regular magnification display mode) is set to be OFF. In step 2-4, an initial display screen of the display 1-5 is set. After the initial setting, reception of a command is waited in step 2-5. If a command is input from the keyboard 1-1, the CPU 1-3 checks in step 2-6 if the command is associated with pattern drawing. If it is not associated with pattern drawing, the command is executed in step 2-14, and the flow advances to step 2-11. If the command is associated with pattern drawing, data for drawing a pattern is generated in step 2-7. In step 2-8, the pointer i 1-2c is incremented by 1. In step 2-9, the drawing data is stored at a position of a line #i of the area 1-2e on the memory 1-2 indicated by the pointer i, and a display control routine 2-10 is called. In the display control routine shown in FIG. 25B, if the pointer i≧1, the content of the flag is checked in step 3-3. If the flag is OFF, the drawing data stored at the position of the line #i is read out in step 3-5, and is converted to regular magnification display form data by the display controller 1-4. The converted data is stored in the memory 6-4a and is displayed on the display 1-5. If NO in step 3-2 (i=0), no processing is performed. When the flow returns from the display control routine, it is checked in step 2-11 if editing is ended. If NO in step 2-11, reception of a command is waited in step 2-5, and the above operation is repeated. If YES in step 2-11, the editing end processing is performed, and the processing is ended.

Figure 35C:
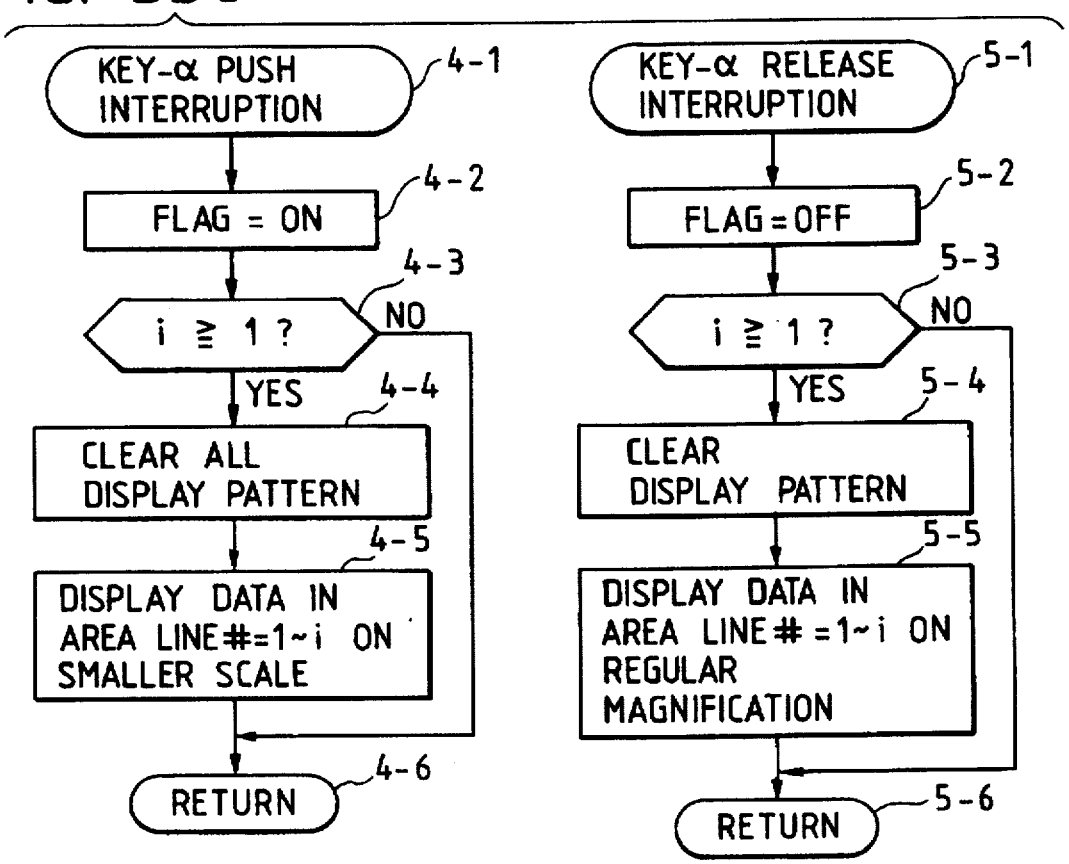

If the key α 1-1a is depressed during the processing of the loop from step 2-5 to step 2-11, a key-α push interruption instruction is generated, and a key-α push interruption routine shown in FIG. 35C is executed. In this routine, in step 4-2, the flag 1-2c is set to be ON. If i<1, the flow directly returns. If i≧1, a pattern formed by drawing data at line #1 to line #i displayed on the display 1-5 is cleared from the memory 6-4a to delete it from the display 1-5. In step 4-5, the drawing data at line #1 to line #i are stored again in the memory 6-4a, and are redisplayed on the display 1-5 while being converted to smaller scale display form data. Thereafter, the flow returns. While the key α1-1a is depressed, the flag 1-2c is kept ON. Therefore, a pattern drawn on the display is displayed on the smaller scale display mode as long as the key α 1-1a is depressed.

When the key α 1-1a is released from a depression state, a key-α release interruption instruction is generated, and a key-α release interruption processing routine shown in FIG. 35C is executed. In this routine, in step 5-2, the flag 1-2c is reset to OFF. If i<1, the flow returns. If i≧1, a pattern displayed on the display 1-5 is deleted by clearing the memory 6-4a in step 5-4. In step 5-5, drawing data at line #1 to line #i are displayed on the display 1-5 in the regular magnification display form. The flow then returns. Thereafter, unless the key α 1-1a is depressed, the regular magnification display is performed.

The operation of the embodiment shown in FIG. 34 has been described. In this embodiment, the display form includes the regular magnification display form and the smaller scale display form. However, any other display forms to be switched may be employed if they are different display forms. The number of display forms to be switched is not limited to two. The number of display forms may be increased by increasing the number of switches.

A switch for switching the display form is not limited to the specific key on the keyboard but may be any key such as a button of a mouse as long as it can indicate an ON/OFF state. Furthermore, an object for display form switching is not limited to a pattern but may be a document.

Figure 36:
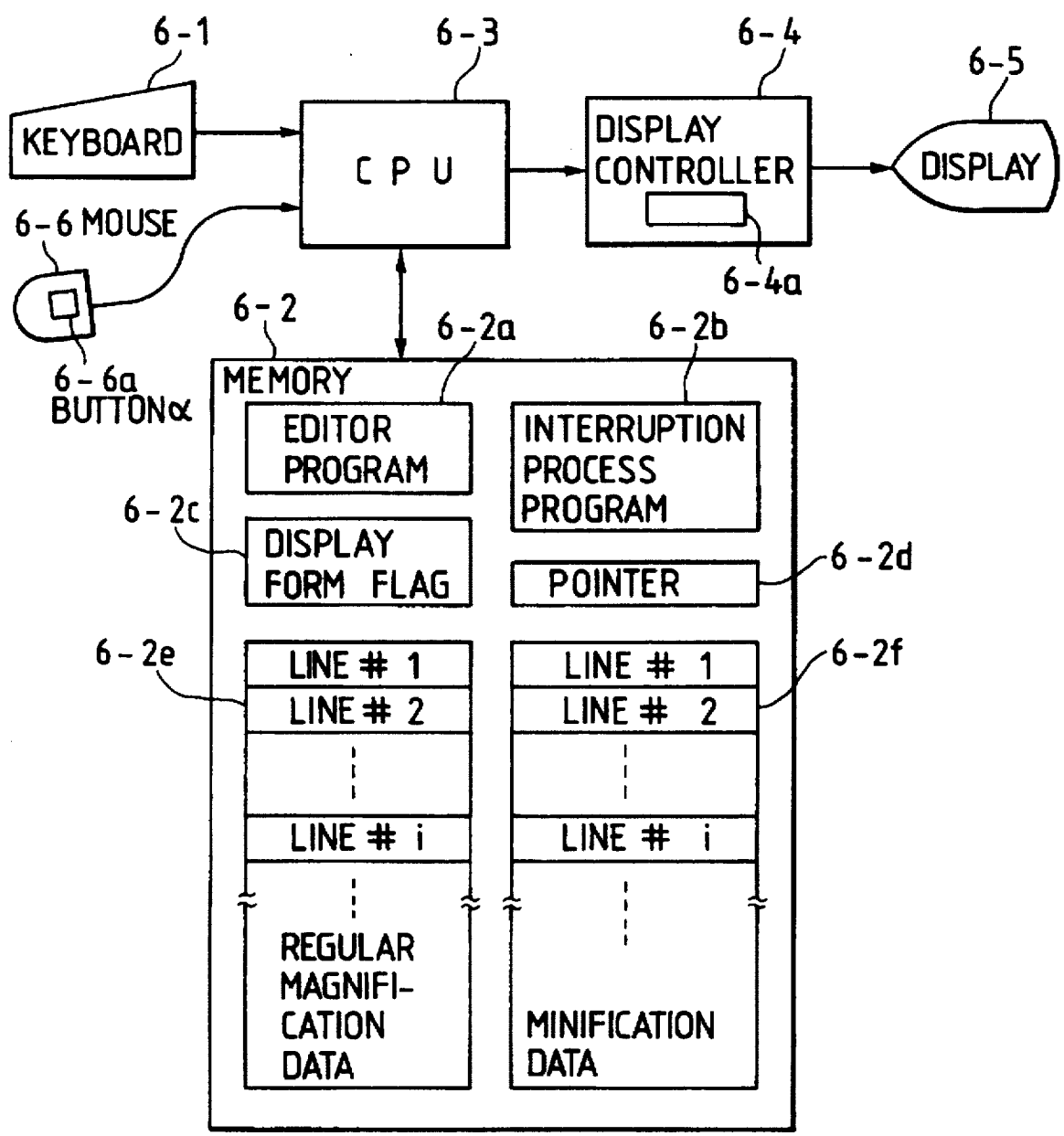
FIG. 36 is a block diagram showing still another embodiment of the present invention.

FIG. 36 shows still another embodiment of the display apparatus according to the present invention.

In the pattern display apparatus of this embodiment, while a specific button α of a mouse is depressed, a display form is switched from a regular magnification display mode to a smaller scale display mode. Basically, a button α 6-5a of the mouse is used in place of the key α 1-1a in FIG. 34. However, a realization method is different from that in FIG. 34. A difference from FIG. 34 will be described below.

In FIG. 34, data generated in step 2-7 of generating pattern drawing data is one for the regular magnification display mode. When the data is displayed in the smaller scale display mode, it is displayed while being calculated in accordance with a smaller scale. In contrast to this, in FIG. 36, in step 2-7, two types of data, i.e., regular magnification data and minification (smaller scale) data are generated at the same time, and are respectively stored in a regular magnification data storage area and a minification data storage area.

Data to be displayed is switched in accordance with the state of a display form flag 6-2c. In this embodiment, when a calculation required for the smaller scale display form is slow, the state of the display form flag 6-2c is changed to prolong a time required for redisplaying the whole pattern on the display, and a response time of an editor is prolonged.

If the two types of data are generated when the drawing data is generated like in this embodiment, a calculation for re-drawing can be omitted, and a response time can be shortened as compared to the above-mentioned system.

What is claimed is:

1. A pattern editing apparatus comprising:

selection means for selecting a plurality of patterns to be object patterns for an editing process of the pattern editing apparatus, the plurality of patterns being displayed in a first area on a screen of a display means, a pattern selected by said selection means being displayed in a second area on the screen of said display means;

providing means responsive to said selection means for providing a pattern for coupling the selected patterns displayed in the second area of the display means, said pattern for coupling representing a flow chart processing relationship among the selected patterns;

means connected to said providing means for generating a signal responsive to absence of any pattern representing a flow chart processing relationship in the selected patterns; and means responsive to the generated signal for adding the pattern representing the flow chart processing relationship as an object pattern of the editing press.

2. An apparatus according to claim 1, wherein said selection means includes a coordinate input device for selecting each of the plurality of patterns for editing processing.

3. An apparatus according to claim 1, further comprising storage means for storing information representing the plurality of patterns.

4. An apparatus according to claim 1, further comprising display means connected to said adding means for displaying the pattern added by said adding means.

5. An apparatus according to claim 3, further comprising display control means for displaying a plurality of patterns stored in said storage means on a display screen.

6. An apparatus according to claim 5, further comprising another display control means for, when said selection means selects said plurality of patterns displayed on a display screen by said display control means, displaying the selected pattern at a designated position on the display screen.

7. An apparatus according to claim 1, further comprising related memory means for storing a pattern representing a flow chart processing relationship related to said pattern displayed by a display means in response to said providing means.

8. An apparatus according to claim 1, further comprising means for retrieving the pattern representing a flow chart processinq relationship on the basis of a pattern representing a flow chart processing relationship stored in a related memory means.

9. An apparatus according to claim 1, wherein said selection means comprises means for selecting a pattern designated by a cursor displayed by a display means.

10. A method for building a plurality of patterns in a pattern editing apparatus comprising the steps of:

selecting a plurality of patterns to be object patterns for an editing process of the pattern editing apparatus, the plurality of patterns being displayed in a first area on a screen of a display device and after said selecting step is executed, to be displayed in a second area on the screen of the display device;

providing a pattern for coupling the selected patterns in response to the selecting step displayed in the second area of the display device, said pattern for coupling representing a flow chart processing relationship among the selected patterns;

generating a signal responsive to absence of any pattern representing a flow chart processing relationship in the selected patterns; and adding the pattern representing the flow chart processing relationship as an object pattern of the editing process in response to the generated signal.

11. A method according to claim 10 further comprising the step of retrieving a plurality of patterns stored in a memory.

12. A method according to claim 10, when a pattern to be designated is selected from the plurality of patterns displayed on a display in said selecting step, further comprising the step of displaying the designated pattern at a position designated by a cursor of said display means.

13. A method according to claim 10, wherein said providing step provides a pattern retrieved from a related memory means storing a pattern having a a flow chart processing relationship.

14. A method according to claim 10 further comprising the step of retrieving the pattern representing a flow chart processing relationship on the basis of patterns representing a flow chart processing relationship stored in related memory means.

15. A method according to claim 14, further comprising the step of displaying a pattern on a display screen of a display means on the basis of the pattern retrieved from said related memory means.

16. A pattern editing apparatus comprising:

selection means for selecting a plurality of patterns to be object patterns for an editing process of the pattern editing apparatus, the plurality of patterns being displayed in a first area of a display means and, after said selection is executed by said selection means, to be displayed in a second area of said display means;

providing means responsive to said selection means for providing a pattern for coupling the selected patterns displayed in the second area of said display means, said pattern for coupling representing a flow chart processing relationship among the selected patterns;

means connected to said providing means for generating a signal responsive to the absence of any pattern representing a flow chart processing relationship in the selected patterns; and means responsive to the generated signal for adding the pattern representing the flow chart processing relationship as an object pattern of the editing process; and related memory means for storing the pattern representing a flow chart processing relationship related to a pattern displayed by the display means in response to said providing means.

* * * * *

UNITED STATES PATENT AND TRADEMARK OFFICE
CERTIFICATE OF CORRECTION

PATENT NO. : 5,721,959
DATED : February 24, 1998
INVENTOR(S) : TAKASHI NAKAMURA, ET AL.

It is certified that error appears in the above-identified patent and that said Letters Patent is hereby corrected as shown below:

COLUMN 1

Line 38, "group-designate" should read --designate--;
Line 45, ", e.g., "YES" or "NO" " should read --(e.g., "YES" or "NO")--;
Line 64, "instructions" should read --instructions.--; and
Line 65, "alternatively," should read --Alternatively,--.

COLUMN 2

Line 33, "system" should read --systems-- and "becoming" should be deleted.

COLUMN 6

Line 25, "table," should read --table, and--.

COLUMN 8

Line 4, "PU" should read --Processor unit ("PU")--.

COLUMN 9

Line 10, "follows." should read --follows:--; and
Line 22, "follows." should read --follows:--.

COLUMN 10

Line 45, "i" should read --$i$--; and
Line 63, "i" should read --$i$--.

UNITED STATES PATENT AND TRADEMARK OFFICE
CERTIFICATE OF CORRECTION

PATENT NO. : 5,721,959
DATED : February 24, 1998
INVENTOR(S) : TAKASHI NAKAMURA, ET AL.

It is certified that error appears in the above-identified patent and that said Letters Patent is hereby corrected as shown below:

COLUMN 11

Line 11, "i" should read --$i$--.

COLUMN 12

Line 44, "(FIG. i2)," should read --(FIG. 12),--.

COLUMN 14

Line 5, "description. FIGS. 19A," should read --description. ¶FIGS. 19A,--.

COLUMN 15

Line 1, "'LINE" should read --"LINE"--.

COLUMN 16

Line 22, "x-axis" should read --X-axis--; and
Line 60, "$(Xn_{-1}, Y_{n-1})$" should read --$(X_{n-1}, Y_{n-1})$--.

COLUMN 19

Line 9, "i" should read --$i$--;
Line 10, "i" should read --$i$--;
Line 24, "i" should read --$i$--;
Line 26, "i" should read --$i$--; and
Line 28, "$i \geq 1$," should read --$i \geq 1$,--.

UNITED STATES PATENT AND TRADEMARK OFFICE
CERTIFICATE OF CORRECTION

PATENT NO. : 5,721,959
DATED : February 24, 1998
INVENTOR(S) : TAKASHI NAKAMURA, ET AL.

It is certified that error appears in the above-identified patent and that said Letters Patent is hereby corrected as shown below:

<u>COLUMN 22</u>

Line 9, "a a" should read --a--; and
Line 35, "and" should be deleted.

Signed and Sealed this

Fifteenth Day of September, 1998

*Attest:*

BRUCE LEHMAN

*Attesting Officer*   Commissioner of Patents and Trademarks